(12) United States Patent
Sun et al.

(10) Patent No.: US 11,298,821 B1
(45) Date of Patent: Apr. 12, 2022

(54) SYSTEMS AND METHODS FOR LEARNING AND GENERATING MOVEMENT POLICIES FOR A DYNAMICAL SYSTEM

(71) Applicant: University of South Florida, Tampa, FL (US)

(72) Inventors: Yu Sun, Tampa, FL (US); Yongqiang Huang, Tampa, FL (US)

(73) Assignee: University of South Florida, Tampa, FL (US)

(*) Notice: Subject to any disclaimer, the term of this patent is extended or adjusted under 35 U.S.C. 154(b) by 226 days.

(21) Appl. No.: 16/837,548

(22) Filed: Apr. 1, 2020

Related U.S. Application Data

(63) Continuation of application No. 16/356,514, filed on Mar. 18, 2019, now Pat. No. 10,611,026.

(60) Provisional application No. 62/746,234, filed on Oct. 16, 2018.

(51) Int. Cl.
| | |
|---|---|
| *B25J 9/16* | (2006.01) |
| *G05B 19/42* | (2006.01) |
| *G06N 3/08* | (2006.01) |
| *G06N 20/00* | (2019.01) |

(52) U.S. Cl.
CPC ............ *B25J 9/163* (2013.01); *B25J 9/1661* (2013.01); *B25J 9/1664* (2013.01); *G05B 19/42* (2013.01); *G06N 3/08* (2013.01); *G06N 20/00* (2019.01)

(58) Field of Classification Search
CPC ........ B25J 9/163; B25J 9/1661; B25J 9/1664; G05B 19/42; G06N 3/08; G06N 20/00
See application file for complete search history.

(56) References Cited

U.S. PATENT DOCUMENTS

| | | | | |
|---|---|---|---|---|
| 5,748,847 | A | * 5/1998 | Lo ........................... | G06N 3/08 706/14 |
| 10,960,539 | B1 | * 3/2021 | Kalakrishnan ......... | G06N 7/005 |
| 2008/0091628 | A1 | * 4/2008 | Srinivasa ................. | G06N 3/08 706/12 |

(Continued)

OTHER PUBLICATIONS

Amor, H. et al., Interaction primitives for human-robot cooperation tasks. In 2014 IEEE International Conference on Robotics and Automation (ICRA), pp. 2831-2837, May 2014.

(Continued)

*Primary Examiner* — Jason Holloway
(74) *Attorney, Agent, or Firm* — Meunier Carlin & Curfman LLC

(57) ABSTRACT

System and methods for generating a trajectory of a dynamical system are described herein. An example method includes modelling a policy from demonstration data. The method also includes generating a first set of action particles by sampling from the policy, where each of the action particles in the first set includes a respective system action, predicting a respective outcome of the dynamical system in response to each of the action particles in the first set, and weighting each of the action particles in the first set according to a respective probability of achieving a desired outcome. The method further includes generating a second set of action particles by sampling from the weighted action particles, where each of the action particles in the second set includes a respective system action, and selecting a next system action in the trajectory of the dynamical system from the action particles in the second set.

20 Claims, 22 Drawing Sheets

(56) References Cited

U.S. PATENT DOCUMENTS

| | | | | |
|---|---|---|---|---|
| 2013/0245824 | A1* | 9/2013 | Barajas | B25J 9/1664 700/253 |
| 2015/0339589 | A1* | 11/2015 | Fisher | B25J 9/16 706/12 |
| 2017/0076196 | A1* | 3/2017 | Sainath | G06N 3/084 |
| 2017/0252924 | A1* | 9/2017 | Vijayanarasimhan | G06N 3/084 |
| 2018/0308005 | A1* | 10/2018 | Banipal | G06N 3/08 |

OTHER PUBLICATIONS

Atkeson, C.G. et al., Robot learning from demonstration. In Proceedings of the Fourteenth International Conference on Machine Learning, ICML '97, pp. 12-20, San Francisco, CA, USA, 1997, Morgan Kaufmann Publishers Inc.

Belanger, D. et al., A linear dynamical system model for text. In Proceedings of the 32nd International Conference on Machine Learning, vol. 37, pp. 833-842, 2015.

Bengio, Y. et al., Learning long-term dependencies with gradient descent is difficult. Trans. Neur. Netw., vol. 5, No. 2, pp. 157-166, Mar. 1994. [Online], Available: http://dx.doi.org/10.1109/72.279181.

Billard, A. et al., Robot programming by demonstration, in Handbook of Robotics, B. Siciliano and O. Khatib, Eds. Secaucus, NJ, USA: Springer, 2008, pp. 1371-1394.

Brandl, S. et al., Generalizing pouring actions between objects using warped parameters. In 2014 IEEE-RAS International Conference on Humanoid Robots, Nov. 2014, pp. 616-621.

Calinon, S. et al., A probabilistic programming by demonstration framework handling constraints in joint space and task space. In 2008 IEEE/RSJ International Conference on Intelligent Robots and Systems, Sep. 2008, pp. 367-372.

Calinon, S. et al., A task-parameterized probabilistic model with minimal intervention control. In 2014 IEEE International Conference on Robotics and Automation (ICRA), pp. 3339-3344, May 2014.

Dai et al., Functional analysis of grasping motion. In Intelligent Robots and Systems (IROS), 2013 IEEE/RSJ International Conference on, pp. 3507-3513. IEEE, 2013.

Do, C. et al., Accurate pouring with an autonomous robot using an RGB-D camera. CoRR, vol. abs/1810.03303, 2018. 12 pages. [Online], Available: http://arxiv.org/abs/1810.03303.

Do, C. et al., Learning to pour using deep deterministic policy gradients. In 2018 IEEE International Conference on Robotics and Automation (ICRA), 2018.

Ewerton, M. et al., Learning multiple collaborative tasks with a mixture of interaction primitives. In 2015 IEEE International Conference on Robotics and Automation (ICRA), May 2015, pp. 1535-1542.

Ganeshmurthy, M. S. et al., Path Planning Algorithm for Autonomous Mobile Robot in Dynamic Environment. 2015 3rd International Conference on Signal Processing, Communication and Networking (ICSCN), 6 pages.

Gers, F.A. et al., Learning precise timing with lstm recurrent networks. J. Mach. Learn. Res., vol. 3, pp. 115-143, Mar. 2003. [Online], Available: https://doi.org/10.1162/153244303768966139.

Graves, A., Generating sequences with recurrent neural networks. CoRR, abs/1308.0850, 2013, 43 pages.

Han, M. et al., Modeling dynamic system by recurrent neural network with state variables. In Advances in Neural Networks—ISNN 2004, 200-205, 2004.

Hersch, M. et al., Dynamical system modulation for robot learning via kinesthetic demonstrations. IEEE Trans, on Robotics, 24(6): 1463-1467, 2008.

Hochreiter, S. et al., Long short-term memory. Neural computation, vol. 9, No. 8, pp. 1735-1780, 1997.

Huang, Y. et al., A dataset of daily interactive manipulation. CoRR, vol. abs/1807.00858, 2018. 6 pages. [Online], Available: http://arxiv.org/abs/1807.00858.

Huang, Y. et al., Generating manipulation trajectory using motion harmonics. In 2015 IEEE/RSJ International Conference on Intelligent Robots and Systems (IROS), pp. 4949-4954, Sep. 2015.

Huang, Y. et al., Learning to pour. In 2017 IEEE/RSJ International Conference on Intelligent Robots and Systems (IROS), 2017, pp. 7005-7010.

Huang, Y. et al., Recent data sets on object manipulation: A survey. Big data, 4(4): 197-216, 2016.

Ijspeert, A.J., Dynamical movement primitives: Learning attractor models for motor behaviors. Neural Comput., 25(2):328-373, Feb. 2013.

Ijspeert, A.J.., Movement imitation with nonlinear dynamical systems in humanoid robots. In Proceedings 2002 IEEE International Conference on Robotics and Automation (Cat. No. 02CH37292), vol. 2, pp. 1398-1403, 2002.

Kober, J. et al., Movement templates for learning of hitting and batting. In 2010 IEEE International Conference on Robotics and Automation, pp. 853-858, May 2010.

Lim, B. et al., Movement primitives, principal component analysis, and the efficient generation of natural motions. In Proceedings of the 2005 IEEE International Conference on Robotics and Automation, pp. 4630-4635, Apr. 2005.

Maeda, G. et al., Learning interaction for collaborative tasks with probabilistic movement primitives. In 2014 IEEE-RAS International Conference on Humanoid Robots, pp. 527-534, Nov. 2014.

Min, J. et al., Interactive generation of human animation with deformable motion models. ACM Trans. Graph., vol. 29, No. 1, pp. 9:1-9:12, Dec. 2009. [Online], Available: http://doi.acm.org/10.1145/1640443.1640452.

Nakanishi, J. et al., Learning from demonstration and adaptation of biped locomotion. Robotics and Autonomous Systems, 47(2):79-91, 2004.

Noda, Y. et al., Predictive filling weight sequence control in automatic pouring system. In 2008 34th Annual Conference of IEEE Industrial Electronics, Nov. 2008, pp. 1527-1532.

Paraschos, A. et al., Probabilistic movement primitives. In C. J. C. Burges et al. editors, Advances in Neural Information Processing Systems 26, pp. 2616-2624. Curran Associates, Inc., 2013.

Pastor, P. et al., Learning and Generalization of Motor Skills by Learning from Demonstration. 2009 IEEE International Conference on Robotics and Automation Kobe International Conference Center Kobe, Japan, May 12-17, 2009, 763-768.

Paulius, D. et al., Functional object-oriented network for manipulation learning. In 2016 IHEE/RSJ International Conference on Intelligent Robots and Systems (IROS), pp. 2655-2662, Oct. 2016.

Qin, S.J. et al., A survey of industrial model predictive control technology. Control Engineering Practice, 11(7):73 3-764, 2003.

Rosado, J. et al., Adaptation of Robot Locomotion Patterns with Dynamic Movement Primitives. 2015 IEEE International Conference on Autonomous Robot Systems and Competition, 23-28.

Sakoe, H. et al., Dynamic programming algorithm optimization for spoken word recognition. In IEEE Transactions on Acoustics, Speech, and Signal Processing, vol. 26, No. 1, pp. 43-49, Feb. 1978.

Schaal, S., et al., (2003). Control, Planning, Learning, and Imitation with Dynamic Movement Primitives. Workshop on Bilateral Paradigms on Humans and Humanoids, IEEE International Conference on Intelligent Robots and Systems (IROS 2003), 1-21.

Schaal, S., Is imitation learning the route to humanoid robots? TICS 3(6):233-242, 1999.

Schaal, S., Movement planning and imitation by shaping nonlinear attractors. In Proceedings of the 12th Yale Workshop on Adaptive and Learning Systems, Yale University, New Haven, CT, 2003, 10 pages.

Schenck, C. et al., Visual closed-loop control for pouring liquids. In 2017 IEEE International Conference on Robotics and Automation (ICRA), May 2017, pp. 2629-2636.

Trischler, A.P. et al., Synthesis of recurrent neural networks for dynamical system simulation. Neural Networks, 80:67-78, 2016.

(56) References Cited

OTHER PUBLICATIONS

Werbos, P., Backpropagation through time: what it does and how to do it. In Proceedings of the IEEE, vol. 78, No. 10, pp. 1550-1560, Oct. 1990.
Yano, Y. et al., Supervisory control of automatic pouring process considering residual pouring quantity. In 2007 European Control Conference (ECC), Jul. 2007, pp. 2045-2050.
Zaremba, W. et al., Recurrent neural network regularization. CoRR, vol. abs/1409.2329, 2014. [Online]. Available: http://arxiv.org/abs/1409.2329.

* cited by examiner

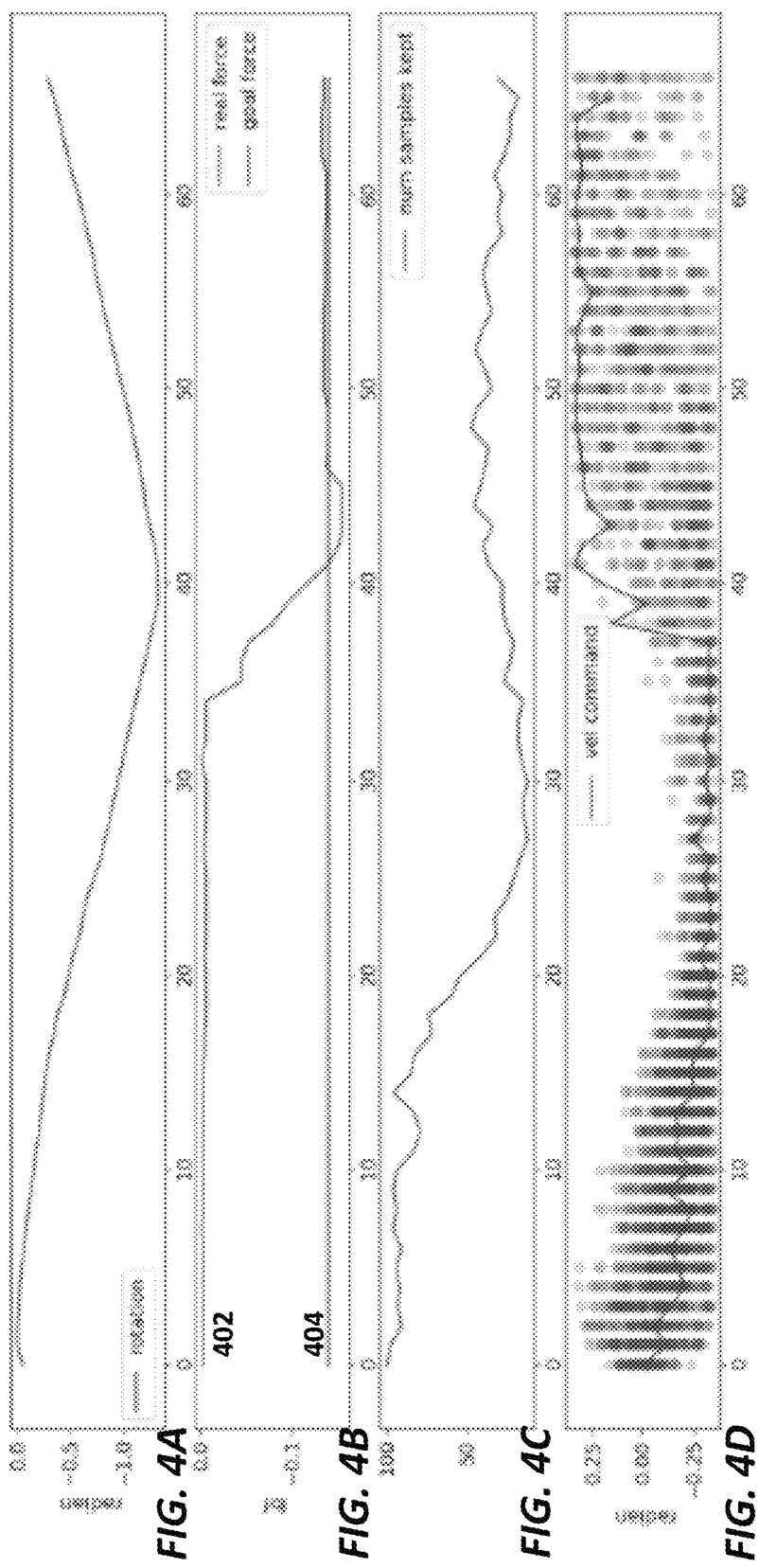

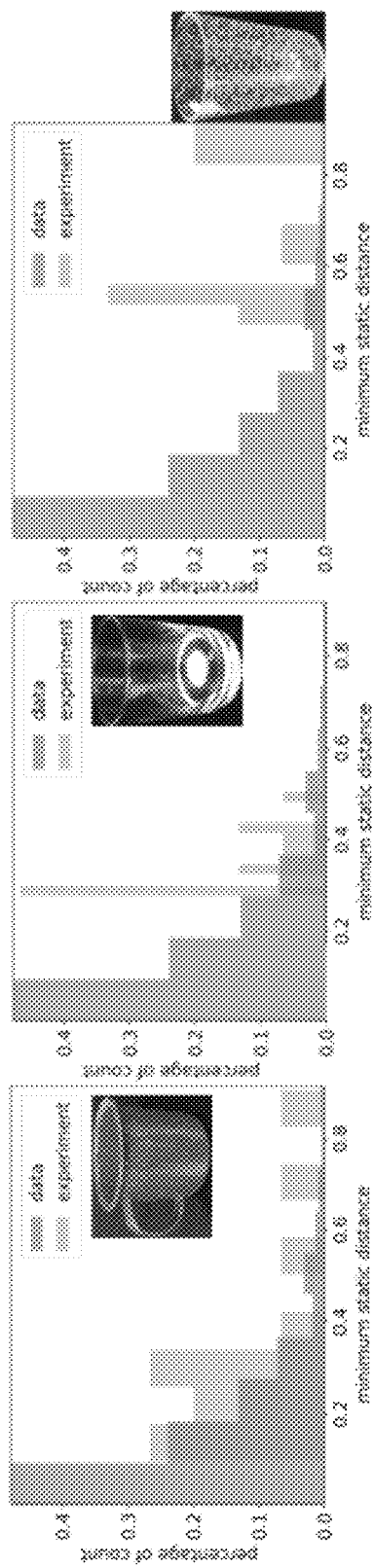
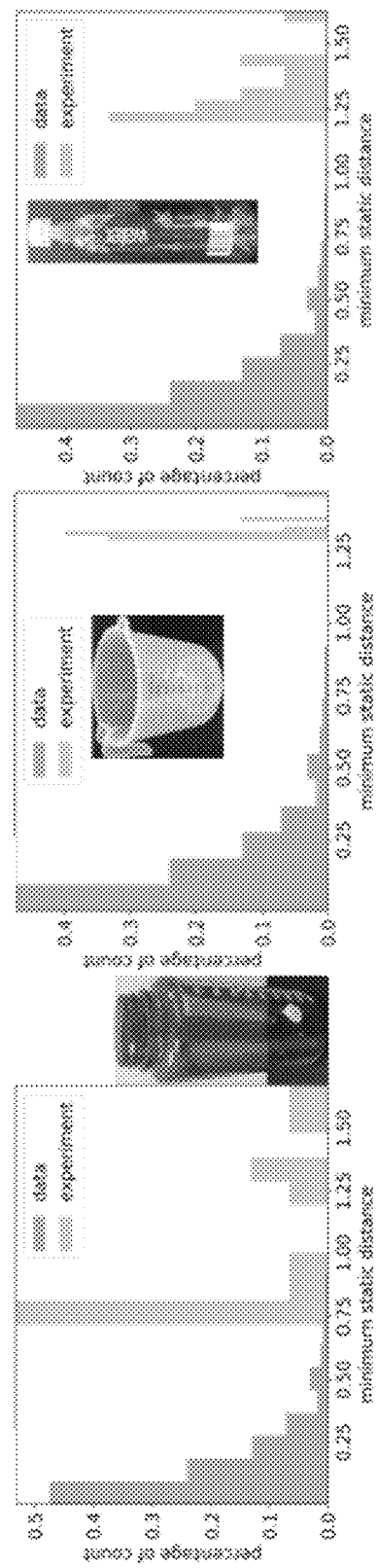
FIG. 21A  FIG. 21B  FIG. 21C
FIG. 21D  FIG. 21E  FIG. 21F

TABLE I
ACCURACY FOR POURING WATER FROM DIFFERENT SOURCE CONTAINERS

| cup | cup in training | $\mu_e$ (mL) | $\sigma_e$ (mL) |
|---|---|---|---|
| red | yes | 3.71 | 3.88 |
| slender bottle | no | 4.12 | 4.29 |
| bubble | no | 6.77 | 5.76 |
| glass | no | 7.32 | 8.24 |
| measuring cup | no | 11.29 | 12.82 |
| fat bottle | no | 12.35 | 8.88 |

FIG. 26A

TABLE II
ACCURACY OF POURING LIQUIDS WITH DIFFERENT VISCOSITIES

| liquid | viscosity (cps) | $\mu_e$ (mL) | $\sigma_e$ (mL) |
|---|---|---|---|
| water | 1 | 3.71 | 3.88 |
| oil | 65 | 4.11 | 4.80 |
| syrup | 2000 | 15.66 | 3.43 |

FIG. 26B

SYSTEMS AND METHODS FOR LEARNING AND GENERATING MOVEMENT POLICIES FOR A DYNAMICAL SYSTEM

CROSS-REFERENCE TO RELATED APPLICATIONS

This application is a continuation of U.S. patent application Ser. No. 16/356,514, filed on Mar. 18, 2019, which claims the benefit of U.S. provisional patent application No. 62/746,234, filed on Oct. 16, 2018, and entitled "SYSTEMS AND METHODS FOR LEARNING AND GENERATING MOVEMENT POLICIES FOR A DYNAMICAL SYSTEM," the disclosures of which are expressly incorporated herein by reference in their entireties.

STATEMENT REGARDING FEDERALLY FUNDED RESEARCH

This invention was made with government support under Grant no. 1560761 awarded by the National Science Foundation. The government has certain rights in the invention.

BACKGROUND

Programming a dynamical system such as a robot to do a large number of tasks under every possible set of constraints is unrealistic. Inspired by humans' remarkable imitation learning capability, researchers introduced Learning from Demonstration (LfD) or Imitation Learning (IL) which learns the policies of a dynamical system performing a task from the demonstrations performed by experts. The problem is similar to what is targeted by Reinforcement Learning (RL), in which the policies are learned through trial-and-error, i.e. letting the dynamical system execute certain policies in the environment under certain constraints and observe corresponding outcomes. The two problems differ in that it is not assumed that it is possible to execute a policy and observe outcome during learning.

LfD approaches could replace programming for a learned task under those constraints that exist in the demonstrations. However, it is possible that the learned policy does not transfer when the constraints change. Since it is unrealistic to demonstrate a task for every possible set of constraints, it is desirable to devise LfD approaches that can learn generalizable policies.

SUMMARY

An example computer-implemented method for generating a trajectory of a dynamical system is described herein. The method can include generating a desired effect on the dynamical system in response to a plurality of system states and effects, where the desired effect is associated with a confidence value. The method can also include predicting a respective corresponding effect on the dynamical system in response to each of a plurality of possible system actions, where each respective corresponding effect is associated with a confidence value. The method can further include comparing each respective corresponding effect on the dynamical system to the desired effect on the dynamical system, and selecting a next system action in the trajectory of the dynamical system based on the comparison.

Optionally, the method can further include generating the possible system actions. In some implementations, the possible system actions can be generated by a user. In other implementations, the possible system actions can be generated using a recurrent neural network (RNN). Optionally, the RNN can include a plurality of long short-term memory (LSTM) units. In some implementations, at least one of the LSTM units is a peephole LSTM unit. Alternatively or additionally, the RNN can optionally include 1 layer and 16 LSTM units.

Alternatively or additionally, the desired effect on the dynamical system can be generated using a first recurrent mixture density network (RMDN). The first RMDN can optionally be trained with demonstration data.

Alternatively or additionally, the respective corresponding effects on the dynamical system can be generated using a second recurrent mixture density network (RMDN). The second RMDN can optionally be trained with demonstration data.

Alternatively or additionally, the trajectory can include a plurality of sequential system states over time.

Alternatively or additionally, the dynamical system can be a robotic system. Optionally, the robotic system can be configured to execute a pouring task. Additionally, the plurality of system states can include at least one of a characteristic of a container, an initial volume in the container, a current volume in the container, a target pour volume, an amount poured, a rotation angle of the container, or an angular velocity of a motor. Alternatively or additionally, the next system action can be a velocity.

An example system for generating a trajectory of a dynamical system is described herein. The system can include a first recurrent mixture density network (RMDN) configured to generate a desired effect on the dynamical system in response to a plurality of system states and effects, where the desired effect is associated with a confidence value. The system can also include a second RMDN configured to predict a respective corresponding effect on the dynamical system in response to each of a plurality of possible system actions, where each respective corresponding effect is associated with a confidence value. The system can further include a processor and a memory operably connected to the processor. The processor can be configured to compare each respective corresponding effect on the dynamical system to the desired effect on the dynamical system, and select a next system action in the trajectory of the dynamical system based on the comparison.

Optionally, the system can include an action generator configured to generate the possible system actions.

Optionally, the system can include a recurrent neural network (RNN) configured to generate the possible system actions. Optionally, the RNN can include a plurality of long short-term memory (LSTM) units. In some implementations, at least one of the LSTM units is a peephole LSTM unit. Alternatively or additionally, the RNN can optionally include 1 layer and 16 LSTM units.

Alternatively or additionally, the system can include a robot, and the processor can be further configured to transmit a command including the next system action to the robot. Optionally, the robot can be configured to execute a pouring task. Additionally, the plurality of system states can include at least one of a characteristic of a container, an initial volume in the container, a current volume in the container, a target pour volume, an amount poured, a rotation angle of the container, or an angular velocity of a motor. Alternatively or additionally, the next system action can be a velocity.

Another example computer-implemented method for generating a trajectory of a dynamical system is described herein. The method can include modelling a policy from demonstration data, where the policy is a distribution of a plurality of system actions conditioned on a plurality of system states and outcomes. The method can also include generating a first set of action particles by sampling from the policy, where each of the action particles in the first set includes a respective system action. Additionally, the method can include predicting a respective outcome of the dynamical system in response to each of the action particles in the first set, and weighting each of the action particles in the first set according to a respective probability of achieving a desired outcome of the dynamical system, where the respective probabilities of achieving the desired outcome are determined using the respective outcome of the dynamical system in response to each of the action particles in the first set. The method can further include generating a second set of action particles by sampling from the weighted action particles, where each of the action particles in the second set includes a respective system action, and selecting a next system action in the trajectory of the dynamical system from the action particles in the second set.

Additionally, the policy can be modeled using a recurrent mixture density network (RMDN).

Alternatively or additionally, the step of weighting each of the action particles in the first set can include calculating a respective reward value for each of the action particles in the first set by comparing a respective outcome of the dynamical system in response to each of the action particles in the first set with the desired outcome of the dynamical system, and weighting each of the action particles in the first set by a respective reward value.

Alternatively or additionally, the step of selecting a next system action in the trajectory of the dynamical system from the action particles in the second set can include estimating a probability density function of the action particles in the second set, and selecting the next system action using the probability density function.

Alternatively or additionally, the step of generating a second set of action particles by sampling from the weighted action particles can include importance sampling from the weighted action particles.

Alternatively or additionally, the respective outcome of the dynamical system in response to each of the action particles in the first set can be associated with a confidence value.

Alternatively or additionally, the respective outcome of the dynamical system in response to each of the action particles in the first set can be predicted using a recurrent mixture density network (RMDN).

Alternatively or additionally, the desired outcome can be defined by a user.

Alternatively or additionally, the policy can be represented in a stochastic fashion.

Alternatively or additionally, the trajectory can include a plurality of sequential system states over time.

Alternatively or additionally, the dynamical system can be a robotic system.

Alternatively or additionally, the demonstration data can be human demonstration data.

Another example system for generating a trajectory of a dynamical system is described herein. The system can include a recurrent mixture density network (RMDN) configured to model a policy from demonstration data. The policy is a distribution of a plurality of system actions conditioned on a plurality of system states and outcomes. The system can also include a processor and a memory operably connected to the processor. The processor can be configured to generate a first set of action particles by sampling from the policy, where each of the action particles in the first set includes a respective system action. The processor can also be configured to predict a respective outcome of the dynamical system in response to each of the action particles in the first set, and weight each of the action particles in the first set according to a respective probability of achieving a desired outcome of the dynamical system, where the respective probabilities of achieving the desired outcome are determined using the respective outcome of the dynamical system in response to each of the action particles in the first set. The processor can be further configured to generate a second set of action particles by sampling from the weighted action particles, where each of the action particles in the second set includes a respective system action, and select a next system action in the trajectory of the dynamical system from the action particles in the second set.

Additionally, the system can include a robot. The processor can also be configured to transmit a command including the next system action to the robot.

It should be understood that the above-described subject matter may also be implemented as a computer-controlled apparatus, a computer process, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

In FIG. 2B, the upper graphs show the trajectories generated by the approach (202), the trajectories generated with no constraints and using the mean of most probable Gaussian component (204), the data (206), the ratio of the samples being kept (208), and the trajectory of next desired state (216). The lower graphs show the kept samples (210), rejected samples (212), and executed samples (214).

FIG. 3A is a front view of the set up. FIG. 3B shows the force sensor. FIG. 3C shows the motor, adapter, and the pouring cup.

FIGS. 4A-4D are graphs illustrating a pouring result using the trajectory generation approach of FIG. 1 in which the precise amount of water to be poured is achieved. FIG. 4A shows the rotation angle of the motor in radians, FIG. 4B shows the goal force (404) and the actual measured force (402), FIG. 4C shows the number of action particles kept after applying the velocity limit constraint, and FIG. 4D shows the pool of action particles and the actually executed velocity.

FIGS. 21A-21F illustrate comparisons of normalized histograms of minimum static distances for (FIG. 21A) red cup, (FIG. 21B) glass cup, (FIG. 21C) bubble cup, (FIG. 21D) fat bottle, (FIG. 21E) measuring cup, and (FIG. 21F) slender bottle.

FIG. 26A is a table (Table I) showing the accuracy of pouring water from different source containers. FIG. 26B is a table (Table II) showing the accuracy of pouring liquids with different viscosities.

DETAILED DESCRIPTION

Figure 1:
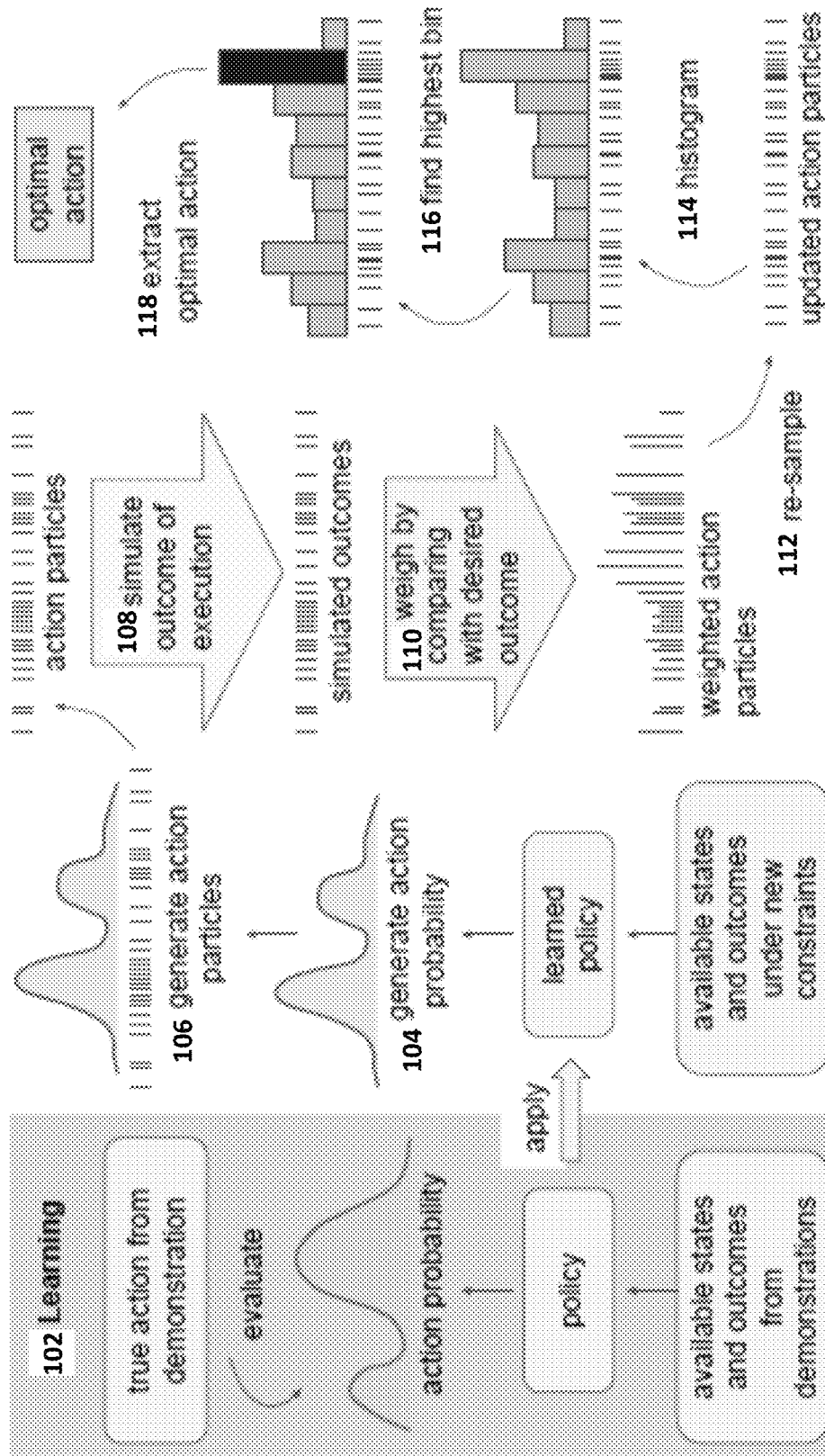
FIG. 1 is a diagram illustrating an example method for generating a trajectory of a dynamical system according to an implementation described herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. While implementations will be described for learning and determining movement policies for a robotic system performing a pouring task, it will become evident to those skilled in the art that the implementations are not limited thereto, but are applicable for learning and determining movement policies for other dynamical systems.

It has been a challenge to apply a policy of a dynamical system learned from limited demonstrations to a new environment which is absent from the demonstrations. The trajectory generation approaches described herein target generalization in their design. In one implementation, the approach learns a broad and stochastic policy from demonstration data, weights the action particles drawn from the policy by their respective likelihood of achieving a desired future outcome, and obtains the optimal action using the weighted action particles. This approach allows the incorporation of various different constraints. The results from an experiment described below (e.g., with respect to FIGS. 3A-4D) show that this approach is able to generalize. In another implementation, the trajectory generation approach drives the system using the "desired effect" on the dynamical system. This approach includes generating the desired effect (e.g., $e_d(t)$) and predicting the corresponding effect of an action (e.g., $\hat{e}(t)$) and optionally generating actions (e.g., u(t). The desired effect (e.g., $e_d(t)$) and the corresponding effect of an action (e.g., $\hat{e}(t)$) can be generated and predicted, respectively, using machine learning models trained with demonstration data.

The end results of LfD approaches are trajectories or sequences of positions in world or joint space, and therefore LfD approaches can be considered as trajectory generation approaches. Existing LfD approaches include Gaussian mixture regression (GMR), movement primitives (MP), interactive primitives (IP), Principal Component Analysis (PCA), and recurrent neural networks (RNN) as described below. The trajectory generation approach described herein differ from the existing LfD approaches in that it considers the system as acting in the state domain and taking effects in the effect domain, and it incorporates uncertainty in its models. The idea is similar to Reinforcement Learning (RL), but RL learns while executing sampled actions, while the approached described herein does not execute any action while learning.

Industrial robots prove very useful for manufacturing because they can achieve high accuracy and repeatability with their movements. However, making changes to the movements requires reprogramming the robots, which can become unfeasible if the changes are many and frequent. To make robots able to adapt when the tasks change, the robotics community have been trying to use human demonstrations to teach robots how to perform tasks and how to adapt to the changes of the tasks. The approach is referred to as learning from demonstration (LfD). One of the key criterions for a LfD algorithm is whether it enables adaptation to the changes of a task, or in other words, whether it enables generalization.

The trajectory generation approaches described herein focus on the task of pouring which is one of the most commonly executed tasks in people's daily lives. In fact, pouring is the second most frequently executed motion in cooking scenarios, with the first place taken by pick-and-place. Pouring relies on gravity to transfer a certain material from a source container to a receiving container. Liquid pouring in particular involves the rotation and translation of the source container which works in accordance with the dynamics of the liquid. Pouring is a sequential process which is driven by the trajectories of the actions that are applied to the source containers. Therefore, pouring can be approached by considering LfD algorithms that generate trajectories.

There are two ways a trajectory can be generated: 1) as a whole which means all the steps in the trajectory are generated at the same time, and 2) step by step in order. The first way considers a task as represented by its shape. It is inflexible because the entire trajectory has to change if any step in the trajectory needs changing. It also contradicts the fact that a task is executed gradually in time rather than in an instant. The second way considers a task as a dynamical system. At one step, the algorithm generates an action, which, once executed, takes the system to the next step.

Reinforcement Learning (RL) learns the action generation policy through trial-and-error, i.e. it executes the current action generation policy and then updates the policy based on the observed outcome. LfD differs from RL in that LfD learns the action generation policy offline and does not execute the policies while learning.

Common trajectory generation approaches are now described. One popular solution for robotic trajectory generation is Gaussian mixture regression (GMR), which bases itself on Gaussian mixture models (GMM). GMR can generate trajectories using specific time stamps. It can also generate trajectories as a dynamical system by learning system states which include position and velocity. Task-parameterized GMR extends GMR to incorporate demonstrations observed from multiple frames.

The movement primitives (MP) is another class of trajectory generation approaches that include many variants. Dynamic movement primitives (DMP), the first of the MPs is capable of modeling discrete movement such as playing table tennis and rhythmic movement such as walking. Interactive primitives (IP) which is based on DMP learns the correlation between the actions of two interacting agents. Probabilistic movement primitives (ProMP) keeps two practices of DMP: 1) using basis functions to represent a reference trajectory, and 2) using a phase variable for temporal modulation. Different from DMP, ProMP does not involves a dynamical system but rather keeps a distribution of the parameters of the basis function expansion. The concept of IP can be applied to ProMP to learn the interaction between two agents. The Interactive ProMP is extended by including GMM to learn multiple interactive patterns.

Principal Component Analysis (PCA) also proves useful for motion generation. Known as a dimension reduction technique used on the dimensionality axis of the data, PCA can be used on the time axis of motion trajectories instead to retrieve geometric variations. Besides, PCA can be applied to find variations in how the motion progresses in time, which, combined with the variations in geometry enables generating motions with more flexibility. Functional PCA (fPCA) extends PCA by introducing continuous-time basis functions and treating trajectories as functions instead of collections of points. One known approach applies fPCA for producing trajectories of gross motion such as answering phone and punching. Another known approach uses fPCA for generating trajectories of fine motion such as pouring.

Designed to handle time sequences, recurrent neural networks (RNN) have recently been chosen more often for sequence generation. An RNN is capable of modeling general dynamical systems, and in comparison to non-dynamical GMR, MP, and fPCA, it does not requires temporal alignment of the demonstrations. As more manipulation datasets become available, it becomes feasible to learn a deep RNN. Linear dynamical systems, an approach that is closely related to RNN can handle time series as well.

Common pouring algorithms are now described. Pouring is a task commonly seen in people's daily lives and is also useful in casting factories. One important ability of a pouring algorithm is its accuracy. In casting factories where molten metal is poured into molds, accurate pouring is required. One approach proposes predicting the residual pouring quantity of the liquid to increase the accuracy of pouring. Another approach introduces predictive sequence control which suppresses the increase of error when the pouring amount increases. Factory-specific pouring algorithms achieve high accuracy but cannot apply to different source containers.

Besides accuracy, the other ability of a pouring algorithm is its adaptability, i.e. that of pouring from different source containers, pouring to different receiving containers, and pouring liquids with different physical properties. If the algorithm bases itself on learning, its adaptability is usually referred to as generalizability, i.e. being able to perform tasks that were not taught during learning. One known approach proposes warping the point cloud of known objects to the shape of a new object, which enables pouring gel balls from one new source cup to three different receiving containers. The algorithm shows adaptability but not accuracy.

It is more desirable that an algorithm exhibits both accuracy and adaptability. One known approach uses deep neural network to estimate the volume of liquid in a cup from raw visual data and uses PID controllers to control the rotation of the robot arm. In 30 pours the average error was 38 milliliter (mL). Three different receiving containers were tested, for which the robot performed approximately the same. However, the authors of this known approach did not claim that the algorithm can generalize to different target containers. Another known approach uses RGB-D point cloud of the receiving cup to determine the liquid height and PID controller to control the rotating angle of the source cup. The pouring action is programmed and is stopped as soon as the desired height is achieved. The mean error of pouring water to three different cups is 23.9 mL, 13.2 mL, and 30.5 mL respectively. The algorithm does not involves learning and can pour both transparent and opaque liquid. Another known approach uses reinforcement learning to learn the policy of pouring water in simulation and tested the policy in actual robots. In the test, the poured height is estimated from RGB-D images. This algorithm averaged a 19.96 mL error over 40 pours, and it generalized to milk, orange juice and apple juice but not to olive oil. The algorithm did not consider using different source or receiving containers.

Among the conventional LfD approaches described above, some fail to preserve the temporal signature of the demonstrations and some generate trajectories while assuming that the constraints do not change. As described herein, the generation of a trajectory can be a stochastic, rather than a static process, and therefore the trajectory generation approach described herein acts dynamically, reacting to feedback in a direct and specific way.

A trajectory generation approach according to one implementation is now described. The approach aims to generalize or act differently to new constraints. First the new constraints can be represented in the form of a desired future outcome. To find a good action, the policy can be sampled to obtain a certain number of action particles, and each action particle can be evaluated based on how likely the desired future outcome is to be met if the particular action particle is executed. The proper action for a new constraint is likely to be different from those seen in the demonstrations. To enable such action particles, representing the policy as deterministic or even as Gaussian, which still has a unique peak, might not suffice. Accordingly, the policy can be represented in a more general fashion which allows more possibilities.

The trajectory generation approach described herein learns a policy from demonstration data. The policy is represented in a broad and stochastic fashion. Under new constraints, the approach generates an action by extracting the optimal action from a pool of action particles that are originally sampled from the learned policy and then weighted by their respective likelihood of achieving a desired future outcome.

This approach contributes the following aspects:

It represents the policy in a stochastic and non-Gaussian fashion rather than as deterministic or Gaussian, so that the learned policy is capable of generating actions that adapt to new environments.

It samples from the policy not one, but many action particles to explore the possibilities of actions enabled by the policy more comprehensively.

It weights an action particle by its likelihood of achieving a desired future outcome that reflects the new constraints and obtains the optimal action using the weighted action particles. This guides the generation process which starts with the learned policy to generalizing to the new constraints.

It incorporates multiple components, which include the learning of action policy from demonstrations, wide exploration of actions, simulating the outcome of an action, designing a desired future outcome to represent the new constraints, and weighting an action by its likelihood of generalizing successfully. The approach provides a full-fledged mechanism towards the goal of generalization.

Referring now to FIG. 1, an example method for generating a trajectory of a dynamical system is described. This disclosure contemplates that the method for generating a trajectory of a dynamical system can be implemented using the artificial neural network(s), mixture density network(s), computing device(s) (e.g., computing device 500 shown in FIG. 5), and/or combinations thereof described below. Optionally, this disclosure contemplates that the dynamical system can be a robotic system. In some implementations, the robotic system includes the artificial neural network(s), mixture density network(s), and/or computing device(s). In other implementations, one or more of the artificial neural network(s), mixture density network(s), and/or computing device(s) are remote from the robotic system. In this configuration, the robotic system and the remote artificial neural network(s), mixture density network(s), and/or computing device(s) can be coupled through one or more communication links. This disclosure contemplates the communication links are any suitable communication link. For example, a communication link may be implemented by any medium that facilitates data exchange between the elements including, but not limited to, wired, wireless and optical links. Example communication links include, but are not limited to, a local area network (LAN), a wireless local area network (WLAN), a wide area network (WAN), a metropolitan area network (MAN), Ethernet, the Internet, or any other wired or wireless link such as WiFi, WiMax, 3G or 4G. Although a robotic system is described in the examples provided below, it should be understood that the example trajectory generation approach can be applied to other dynamical systems.

Physical dynamical systems such as robots exist and progress in the physical world which imposes specific constraints on the states at which the system can be, the actions the system can take, and any other quantity that the system may affect. There can be one or multiple constraints on the robotic system, which may change when, for instance, the location of the robot changes or when a different robot is used. The constraints can include, but are not limited to, the range of permitted actions, the desired next state for a certain time stamp, the prohibited outcome of taking an action, and any other restriction. Taking robots for example, the constraints can include, but are not limited to, the maximum permitted speed of the robotic arm, the space in which the arm is allowed to move, a ball tied to a string which the arm is expected to hit, etc.

The dynamical system (e.g., robotic system) described herein has system states that change through time. A trajectory represents the state evolution of the system. Each point on the trajectory represents a state of the system at a specific time stamp. In other words, the trajectory can include a plurality of sequential system states over time. The system or its state transitions from one time stamp to the next through the execution of an action. The dynamical system interacts with the environment, and a state of the system results in an outcome through the interaction.

The trajectory generation approach described herein address the problem of learning a dynamical system and applying the system to new constraints. Without losing generality, it is assumed that the dynamical system performs a task. The learning of a task can rely on human demonstrations (e.g., the demonstration data described herein can be human demonstration data), for which it is assumed that humans perform the task in an optimal or near-optimal way. FIG. 1 illustrates an approach of trajectory generation which learns from the demonstrations (e.g., human demonstration data) and then generalizes to new constraints.

First, the approach learns from human demonstrations a policy, which is represented in a stochastic fashion (FIG. 1, step 102). The policy gives a distribution of possible actions conditioned on the current and past states and outcomes (FIG. 1, step 104). In other words, the method can include modelling a policy from demonstration data, where the policy is a distribution of a plurality of system actions conditioned on a plurality of system states and outcomes. As described below, the policy can be modeled using a recurrent mixture density network (RMDN). A RMDN combines an RNN and a mixture density network. This allows the model to provide both an output (e.g., a next system action, predicted outcome of a dynamical system, etc.) as well as its confidence value (e.g., variance). The RMDN can be trained using human demonstration data. It should be understood that an RMDN is provided only as an example. This disclosure contemplates that any model that is capable of modeling time-dependent and multi-modal distributions can be used. For example, dynamical-system based Gaussian mixture regression (GMR) can be used. As used herein, human demonstration data can include any data collected during human trials of task performance. This data can include, but is not limited to, force measurements, torque measurements, linear measurements, angular measurements, volume measurements, velocity measurements, acceleration measurements, temporal measurements, red, green, and blue (RGB) images, depth images, etc. This disclosure contemplates collecting human demonstration data with sensors known in the art.

The policy describes the continuous action space which is infinite and therefore it is impossible to evaluate the policy completely. Evaluation of the full landscape of the policy can be approximated by sampling from it. For example, a certain number of action particles can be generated by sampling from the conditional distribution output by the learned policy (FIG. 1, step 106). In other words, the method can include generating a first set of action particles by sampling from the policy, where each of the action particles in the first set includes a respective system action.

The approach generates a trajectory in a sequential manner. For example, it generates the state at one time stamp only after it has finished generating the state at the previous time stamp. At any time stamp, a certain number of actions are generated by sampling from the learned policy as illustrated by FIG. 1, step 106. Each action, once executed, will cause the system to move to a future new state, or a state at the next time step. Thereafter, the outcome of the future new state can be simulated (FIG. 1, step 108). In other words, the method can include predicting a respective outcome of the dynamical system in response to each of the action particles in the first set. The predicted outcome of the dynamical system in response to an action particle can be associated with a confidence value. For example, the outcome of the dynamical system in response to an action particle can be predicted using an RMDN. The RMDN can be trained using human demonstration data as described above. It should be understood that the RMDN used to model the policy is different than the RMDN used to predict outcome of the dynamical system in response to an action particle.

A desired outcome can be defined for the next time stamp. The desired outcome represents the new constraints imposed on the system. The desired outcome can be defined by a user. The method can include weighting each of the action particles in the first set according to a respective probability of achieving the desired outcome of the dynamical system. The respective probabilities of achieving the desired outcome can be determined using the respective outcome of the dynamical system in response to each of the action particles in the first set. For example, for each action particle, a reward can be calculated by comparing the simulated future outcome with the desired future outcome (FIG. 1, step 110). The rewards can be normalized and then used to weight the particles. In other words, the step of weighting each of the action particles in the first set can include calculating a respective reward value for each of the action particles in the first set by comparing a respective outcome of the dynamical system in response to each of the action particles in the first set with the desired outcome of the dynamical system, and weighting each of the action particles in the first set by a respective reward value.

A new set of action particles are generated by sampling from the original set of action samples with replacement using the weights as probabilities (FIG. 1, step 112). This can be accomplished with importance sampling. In other words, the method can include generating a second set of action particles by sampling from the weighted action particles, where each of the action particles in the second set includes a respective system action. Optionally, the step of generating a second set of action particles by sampling from the weighted action particles can include importance sampling from the weighted action particles. The updated action particles serve as a discrete representation of the distribution of actions conditioned on both the learning and the new environment (e.g., the desired future outcome), and the probability of each action particle is represented by its count. The probability density of the updated action particles can be estimated using a histogram (FIG. 1, step 114). The highest bin of the histogram is then identified (FIG. 1, step 116). From the highest bin, the next system action, which can optionally be the optimal action, is extracted (FIG. 1, step 118). In other words, the method can include selecting a next system action in the trajectory of the dynamical system from the action particles in the second set. The step of selecting a next system action can include estimating a probability density function of the action particles in the second set, and selecting the next system action using the probability density function.

The next system action can be transmitted to the dynamical system (e.g., the robotic system) for execution. For example, a command can be transmitted from a computing device to the dynamical system. Executing the next system action (e.g., the optimal action) transitions the dynamical system in time and to a new state. The method illustrated by FIG. 1, steps 102-118 can then be repeated such that the dynamical system can execute a next system action and transition to the next system state.

The system state is denoted at time t by $x_t$, and $x_t$ depends on t. The system interacts with the environment, and through which, state $x_t$ produces an outcome $z_t$. The interaction mechanism is referred to as dynamics, which maps the available history of states and outcomes to the outcome:

$$z_t \leftarrow x_{1:t} z_{1:t-1}. \tag{1}$$

At time t, the system executes an action at on $x_t$ which produces the next state $x_{t+1}$. The mechanism of the state transition model s(•) is assumed to be known:

$$x_{t+1} = s(x_t, a_t). \tag{2}$$

The policy is a mapping from the available history of states and outcomes to the actions:

$$a_t \leftarrow x_{1:t}, z_{1:t} \quad (3)$$

where $x_{1:t} = \{x_1, x_2, \ldots, x_t\}$ and similarly $z_{1:t} = \{z_1, z_2, \ldots, z_t\}$. $t_0 = 1$ is the start time of the history.

To summarize, the behavior of the dynamical system in question can be illustrated as:

$$\xrightarrow{a_{t-1}} x_t \xrightarrow{a_t} x_{t+1} \xrightarrow{a_{t+1}} \quad (4)$$
$$\downarrow \quad\quad \downarrow$$
$$z_t \quad\quad z_{t+1}$$

(4)

A technique for learning of stochastic policy from demonstration is now described. The specific representation for the policy (Eq. (32)) is defined to be the distribution of actions conditioned on the available history of states and outcomes:

$$p(a_t | x_{1:t}, z_{1:t}) \quad (5)$$

The policy can be both 1) probabilistic and multi-modal so that it supports actions for new constraints, and 2) capable of handling the sequence of system states and outcomes. Any model that is capable of modeling time-dependent and multi-modal distributions can be used. As an example, a recurrent mixture density networks (RMDN), which combine recurrent neural networks and mixture density networks, are used in the examples described herein.

A technique for generalizing new constraints now described. At any time stamp, a policy provides a conditional distribution of all actions. Any particular action, once executed, will move the system to a future new state. The following assumption can be made:

Assumption (1)—The dynamics is modeled.

Assumption (1) implies that the outcome will be known when the state is known. In other words, the $f(\bullet)$ in $z_t = f(x_{1:t}, z_{1:t-1})$ is known. Thus, an action is associated with a future outcome.

The change of constraints can include one or both of two cases: 1) the type of constraints changes (e.g., a constraint appears or disappears), or 2) the value of one type of existing constraint changes. A type of constraint at a time stamp is represented by a desired future outcome. A reward for an action is computed by comparing its corresponding future outcome with the desired one, and the action is evaluated using the reward.

An action selection theory is now described. It is assumed that the system has started at $t_0 = 1$ and has run and arrived at time t, residing at state $x_t$ and having an outcome $z_t$. The focus is on the transition of the system state from time t to time t+1 through the execution of an action $a_t$ at time t.

It is desired to take the optimal action at time t. If no information is given except for the data used to train the policy, then the optimal action is the one that has the highest probability given by the policy $$a_t^* = \arg\max_{a_t} p(a_t | x_{1:t}, z_{1:t}).$$

A new constraint at time t+1 is represented by a desired outcome value $c_{t+1}$ that is assumed as given. The optimal action under the new constraint at time t will result in a future outcome value ct+1. If realizing the desired future outcome is the only demand for time t, then the optimal action is obtained by:

$$a_t^* = \arg\max_{a_t} r(z_{t+1}(a_t), c_{t+1}), \quad (6)$$

where $$z_{t+1}(a_t) = f(x_{1:t+1}, z_{1:t}) = f(x_{1:t}, z_{1:t}, x_{t+1}) = f(x_{1:t}, z_{1:t}, s(x_t, a_t)), \quad (7)$$

and $r(z_{t+1}, c_{t+1})$ is a user-defined non-negative reward function that achieves a higher value when $z_{t+1}$ is close to $x_{t+1}$ than when $z_{t+1}$ is far from $x_{t+1}$, for instance, $r(x, y) = \exp(-/x-y/)$. If it is expected that an action both leads to the desired outcome and still be governed by the policy, then the optimal action is obtained by:

$$a_t^* = \arg\max_{a_t} r(z_{t+1}(a_t), c_{t+1}) \text{ where } a_t \sim p(a_t | x_{1:t}, z_{1:t}), \quad (8)$$

which is similar to Model Predictive Control (MPC). However, the approach described herein is different from MPC in that the learning from the demonstration is used as prior, which enables importance sampling, e.g., as described at FIG. 1, step 112.

When M (M>1) independent constraints $\{c_{(t+1,m)}\}_{m=1}^{M}$ are imposed, the reward function incorporates each respective reward, for instance, $$r = \alpha_m \sum_{m=1}^{M} r_m(z_{t+1}, c_{(t+1,m)}), \quad (9)$$

where $a_m$'s are weighting factors.

The optimal action is found by selecting from a pool of action particles generated using importance sampling. First a set of n action particles is generated by sampling from the policy:

$$\hat{a}_{t,i} \xleftarrow{\text{sampling}} p(a_t | x_{1:t}, z_{1:t}), i = 1 \ldots n \quad (10)$$

Each action particle produces a reward $r_{t,i}$. The weight of each particle is computed by normalizing the rewards:

$$w_{t,i} = r_{t,i} / \sum_{i=1}^{n} r_{t,i}$$

Using the weight $w_{t,i}'$ of each action particle as its probability, the existing set of n action particles with replacement is sampled, and a new set of n action particles is obtained:

$$\hat{a}_{t,j} \xleftarrow{\text{sampling with probability } w_{t,i}} \{\hat{a}_{t,i}\}_{i=1}^{n}, j = 1 \ldots n \quad (11)$$

The probability density of the new set of action particles $\{\hat{a}_{t,j}\}_{j=1}^{n}$ is estimated using histogram. The action particles that reside in the highest bin of the histogram are considered optimal actions. The average value of the edge values of the bin are used as the optimal action.

An illustrative example is now described. The approach with a trivial problem is illustrated, in which the dynamics are simplified to an identity function ($z_t=x_t$). Two constraints are included: 1) the maximum magnitude of an action /a/max, and 2) the desired future state $c_{t+1}$. The magnitude constraint accepts or rejects actions. The second constraint computes the difference between the desired state $c_{t+1}$ and the actual state $x_{t+1}$, and can be, for instance, defined using the Gaussian function:

$$r(c_{t+1}|x_{t+1}) = \frac{1}{\sigma\sqrt{2\pi}} \exp\left(-\frac{(c_{t+1} - x_{t+1})^2}{2\sigma^2}\right), \quad (12)$$

where σ needs to be determined.

Figure 2B:
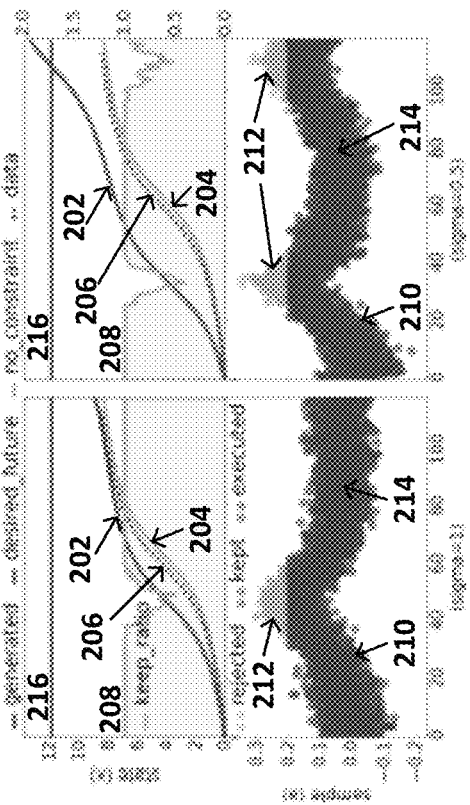
FIG. 2B are graphs illustrating the effect of magnitude of action and desired future state.
Figure 2A:
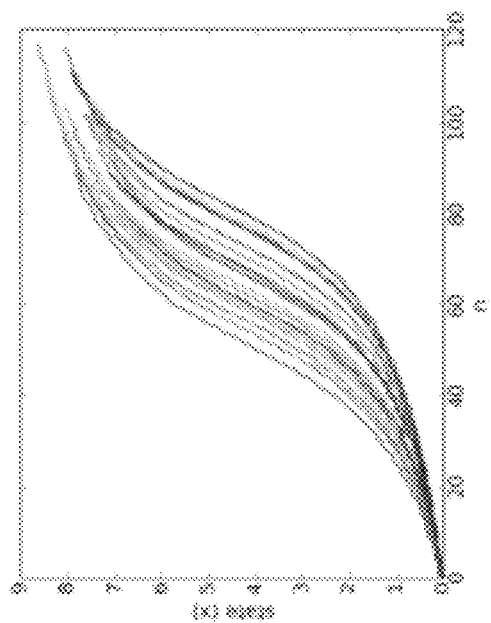
FIG. 2A is a graph illustrating 25 generated trajectories as demonstrations.

Twenty five (25) one-dimensional variable-length trajectories are created as data, as shown in FIG. 2A, in which each trajectory is generated by a dynamical system $x_{n+1}=x_n+a_n$. The result of imposing a maximum action magnitude of 0.15 and a constant desired future state $c_{t+1}=12$ is shown. FIG. 2B shows the results of two different σ's from Eq. (12): σ=1 (left side of FIG. 2B) and σ=0.5 (right side of FIG. 2B). Actions whose magnitude exceed the maximum magnitude are rejected. A smaller a results in a narrower Gaussian for the reward function and leads to a higher weight for a state that is close to the desired and lower weight for a state that is far from the desired, increasing the effect of the desired future state to the generation. With a greater pull from the desired future state, the magnitude of the particles have higher values. The trajectory achieves the desired future state and overshoots. The generation with larger σ gets less pull from the desired future state and the generated trajectory mostly conforms to the learned policy.

Results of an experiment are now described. The approach was tested with the pouring task which is the second most frequently executed task in kitchen scenarios. Data from four hundred and sixty six (466) trials of pouring variable amount of water from 9 cups of different height and outlet diameters into the same receiving cup were collected. Each trial contains the data of:

{$\vartheta_t$}: the sequence of the rotation angle of the pouring cup (degree)

{$f_t$}: the sequence of the force measured under the receiving up (lbf)

$f_{init}$: the force measured of the water in the pouring cup before pouring (lbf)

$f_{pour}$: the force measure of water to pour out (lbf)

h: the height of the pouring cup (millimeter)

d: the outlet diameter of the pouring cup (millimeter)

The state is the rotation angle of the pouring cup $x_t=\theta_t$. The environment is the force sensor, and the outcome is the force reading of the receiving cup $z_t=f_t$. The action is the angular velocity of the pouring cup $a_t=\omega_t=f_s\cdot(\theta_{t+1}-\theta_t)$, where fs=60 Hz is the sampling frequency of data.

An RMDN was trained to model the policy, and a regular RNN to model the dynamics. At time t, the input to the policy network is {$\vartheta_t$, $f_t$, $f_{init}$, $f_{pour}$, h, d} and the output is $\omega_t$; the input to the dynamics network is {$\vartheta_t$, $f_t$, $f_{init}$, $f_{pour}$, h, d} and the output is $f_t$.

Figure 3C:
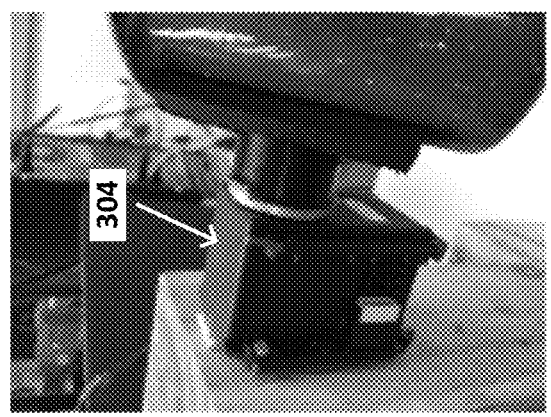
FIGS. 3A-3C illustrate an example experiment setup. The setup includes a clear receiving cup (302), a black motor (304), a red pouring cup (306) which is connected to the motor through a three dimensional (3D) printed adapter, and a force sensor (308). The force sensor is placed underneath the receiving cup, under the plastic cover.
Figure 3B:
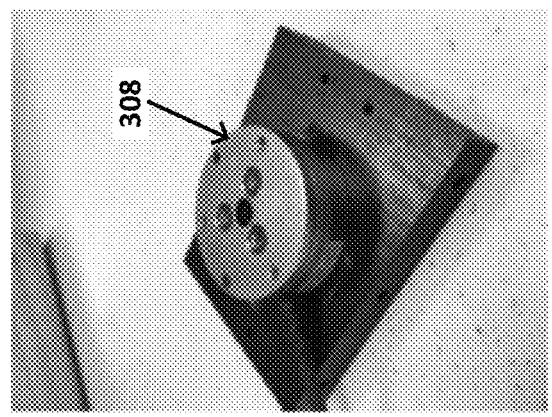
Figure 3A:
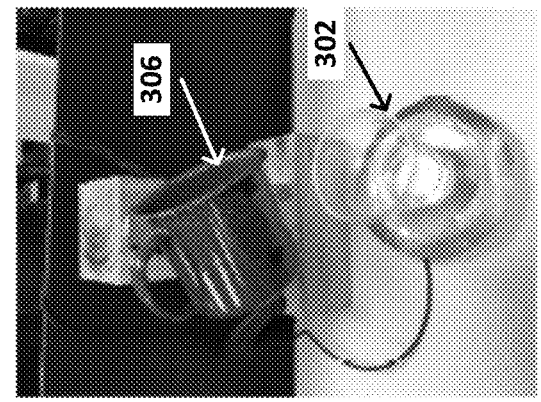

The setup shown in FIGS. 3A-3C was used to conduct the experiment. $f_{init}$ and $f_{pour}$ were measured before a test trial. Two kinds of constraints were applied: 1) velocity limit $\omega_{max}$, 2) goal force $f_{goal}=f_{pour}$. The reward function for the velocity limit constraint is defined using a step function:

$$r(\omega_t, \omega_{max}) = \begin{cases} 1 & \text{if } |\omega_t| \leq \omega_{max} \\ 0 & \text{if } |\omega_t| > \omega_{max} \end{cases}. \quad (13)$$

The desired outcome for time t is defined as:

$$c_{t+1}=f_t-\lambda(f_t-f_{goal}) \quad (14)$$

where $\lambda \in [0, 1]$ is user-defined parameter. The reward function for the goal force constraint is defined as:

$$r(f_{t+1}, c_{t+1}) = \exp\left(-\frac{(f_{t+1} - c_{t+1})^2}{2\sigma^2}\right), \quad (15)$$

where σ is a user-defined parameter. The goal of the experiment is to pour precisely $f_{pour}$ amount of water to the receiving cup.

At each time stamp, the system obtains the current force reading, receives the current rotation angle from the motor, and calculates the velocity. The velocity is executed by the motor, which sends back the resulting rotation angle. The system was manually stopped when the cup has rotated back to where it started.

An example result to illustrate the approach of FIG. 1 is shown in FIGS. 4A-4D. Starting from the top, for each time step, FIG. 4A shows the rotation angle of the motor in radians, FIG. 4B shows the goal force (404) and the actual measured force (402), FIG. 4C shows the number of action particles kept after applying the velocity limit constraint, and FIG. 4D shows the pool of action particles and the actually executed velocity. It can be seen from the second subfigure that the actual force matches the goal force after the cup rotates back, which shows that the approach generalizes to the new goal.

The trajectory generation approach described above learns a broad and stochastic policy from demonstrations, weights action particles drawn from the policy by their respective likelihood of generalizing to a new environment, and obtains the optimal action using the weighted action particles. The trajectory generation approach described above avoids greedy search because it incorporates prior from the learning from the demonstration. The trajectory generation approach described above is related to motion planning, which assumes more and possibly complete knowledge of the environment and which computes the optimal path as a whole. A motion planning approach requires the evaluation of the outcomes of all possible actions (probably through statistical sampling) for a single time stamp, a procedure that is to be followed for any path spawned from then on, so that the optimal path can be identified. When the number of time stamps is not known, the computation cost may become prohibitive. Also, a run-time change of the environment will nullify a determined path and requires planning again. In comparison to a motion planning approach, the trajectory generation approach described above is able to generate a trajectory with arbitrary length, and treats the change of the constraints naturally without regret. Also, the trajectory generation approach described above incorporates the experience learned from demonstration, which motion planning does not consider. The learning part counts as a portion of the elaborate planning of motion planning. Additionally, the trajectory generation approach described above is more appropriate for generalization than motion planning. Scalability for the approach is not a serious concern because for robotic manipulation the degrees of freedom are typically not high.

Example machine learning algorithms are now described. An artificial neural network (ANN) is a computing system including a plurality of interconnected neurons (e.g., also referred to as "nodes"). This disclosure contemplates that the nodes can be implemented using a computing device (e.g., a processing unit and memory as described herein with respect to FIG. 5). The nodes can optionally be arranged in a plurality of layers such as input layer, output layer, and one or more hidden layers. Each node is connected to one or more other nodes in the ANN. As used herein, nodes in the input layer receive data from outside of the ANN, nodes in the hidden layer(s) modify the data between the input and output layers, and nodes in the output layer provide the results. Each node is configured to receive an input, implement a function (e.g., sigmoid function or rectified linear unit (ReLU) function), and provide an output in accordance with the function. Additionally, each node is associated with a respective weight. ANNs are trained with a data set (e.g., the demonstration data described herein) to minimize the cost function, which is a measure of the ANN's performance. Training algorithms include, but are not limited to, backpropagation (BP). The training algorithm tunes the node weights and/or biases to minimize the cost function. It should be understood that any algorithm that finds the minimum of the cost function can be used to for training the ANN. A recurrent neural network (RNN) is a type of ANN. ANNs, including RNNs, are known in the art and are therefore not described in further detail herein.

It should be appreciated that the logical operations described herein with respect to the various figures may be implemented (1) as a sequence of computer implemented acts or program modules (i.e., software) running on a computing device (e.g., the computing device described in FIG. 5), (2) as interconnected machine logic circuits or circuit modules (i.e., hardware) within the computing device and/or (3) a combination of software and hardware of the computing device. Thus, the logical operations discussed herein are not limited to any specific combination of hardware and software. The implementation is a matter of choice dependent on the performance and other requirements of the computing device. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 5:
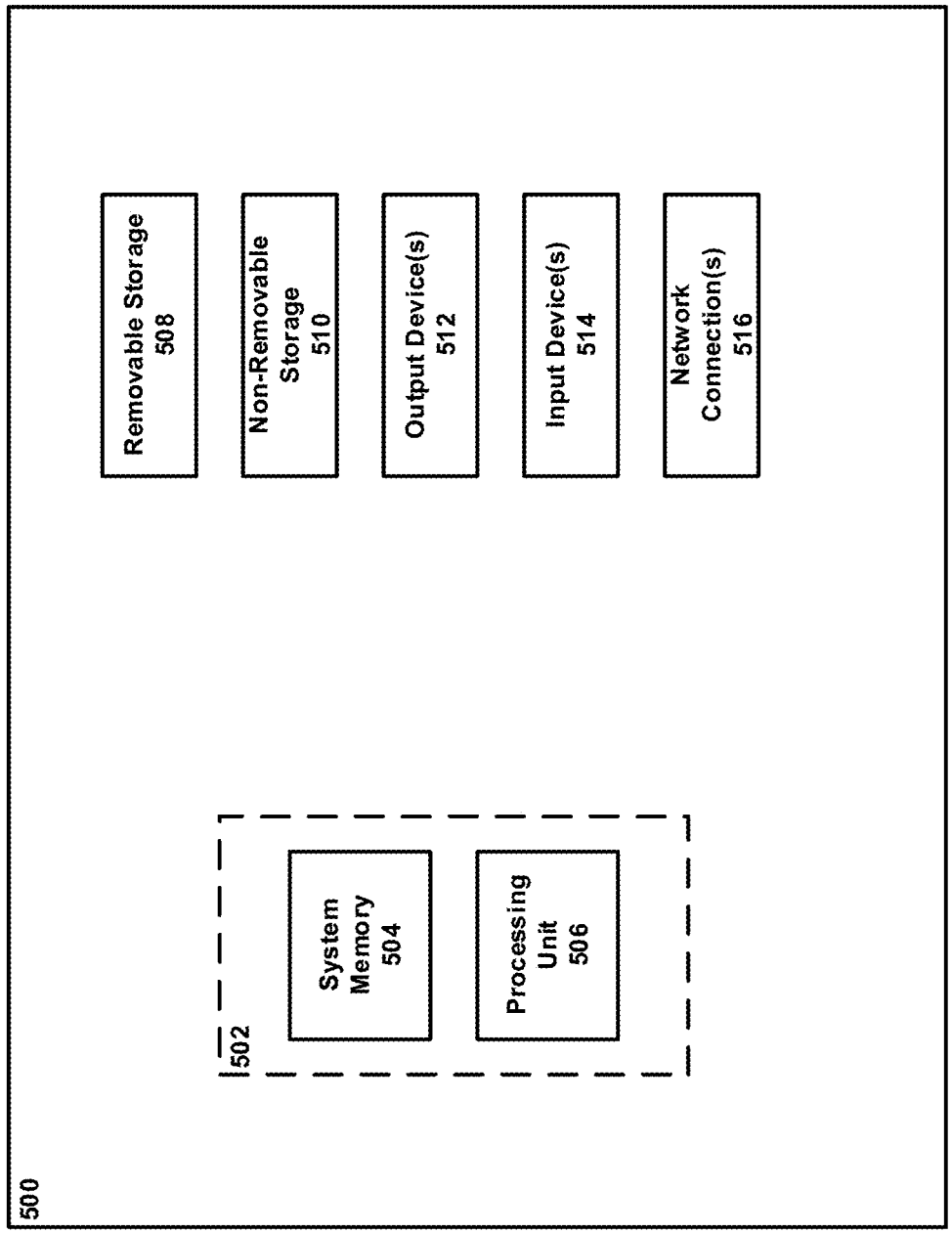
FIG. 5 is a block diagram of an example computing device.

Referring to FIG. 5, an example computing device 500 upon which the methods described herein may be implemented is illustrated. It should be understood that the example computing device 500 is only one example of a suitable computing environment upon which the methods described herein may be implemented. Optionally, the computing device 500 can be a well-known computing system including, but not limited to, personal computers, servers, handheld or laptop devices, multiprocessor systems, microprocessor-based systems, network personal computers (PCs), minicomputers, mainframe computers, embedded systems, and/or distributed computing environments including a plurality of any of the above systems or devices. Distributed computing environments enable remote computing devices, which are connected to a communication network or other data transmission medium, to perform various tasks. In the distributed computing environment, the program modules, applications, and other data may be stored on local and/or remote computer storage media.

In its most basic configuration, computing device 500 typically includes at least one processing unit 506 and system memory 504. Depending on the exact configuration and type of computing device, system memory 504 may be volatile (such as random access memory (RAM)), non-volatile (such as read-only memory (ROM), flash memory, etc.), or some combination of the two. This most basic configuration is illustrated in FIG. 5 by dashed line 502. The processing unit 506 may be a standard programmable processor that performs arithmetic and logic operations necessary for operation of the computing device 500. The computing device 500 may also include a bus or other communication mechanism for communicating information among various components of the computing device 500.

Computing device 500 may have additional features/functionality. For example, computing device 500 may include additional storage such as removable storage 508 and non-removable storage 510 including, but not limited to, magnetic or optical disks or tapes. Computing device 500 may also contain network connection(s) 516 that allow the device to communicate with other devices. Computing device 500 may also have input device(s) 514 such as a keyboard, mouse, touch screen, etc. Output device(s) 512 such as a display, speakers, printer, etc. may also be included. The additional devices may be connected to the bus in order to facilitate communication of data among the components of the computing device 500. All these devices are well known in the art and need not be discussed at length here.

The processing unit 506 may be configured to execute program code encoded in tangible, computer-readable media. Tangible, computer-readable media refers to any media that is capable of providing data that causes the computing device 500 (i.e., a machine) to operate in a particular fashion. Various computer-readable media may be utilized to provide instructions to the processing unit 506 for execution. Example tangible, computer-readable media may include, but is not limited to, volatile media, non-volatile media, removable media and non-removable media implemented in any method or technology for storage of information such as computer readable instructions, data structures, program modules or other data. System memory 504, removable storage 508, and non-removable storage 510 are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 506 may execute program code stored in the system memory 504. For example, the bus may carry data to the system memory 504, from which the processing unit 506 receives and executes instructions. The data received by the system memory 504 may optionally be stored on the removable storage 508 or the non-removable storage 510 before or after execution by the processing unit 506.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Figure 6:
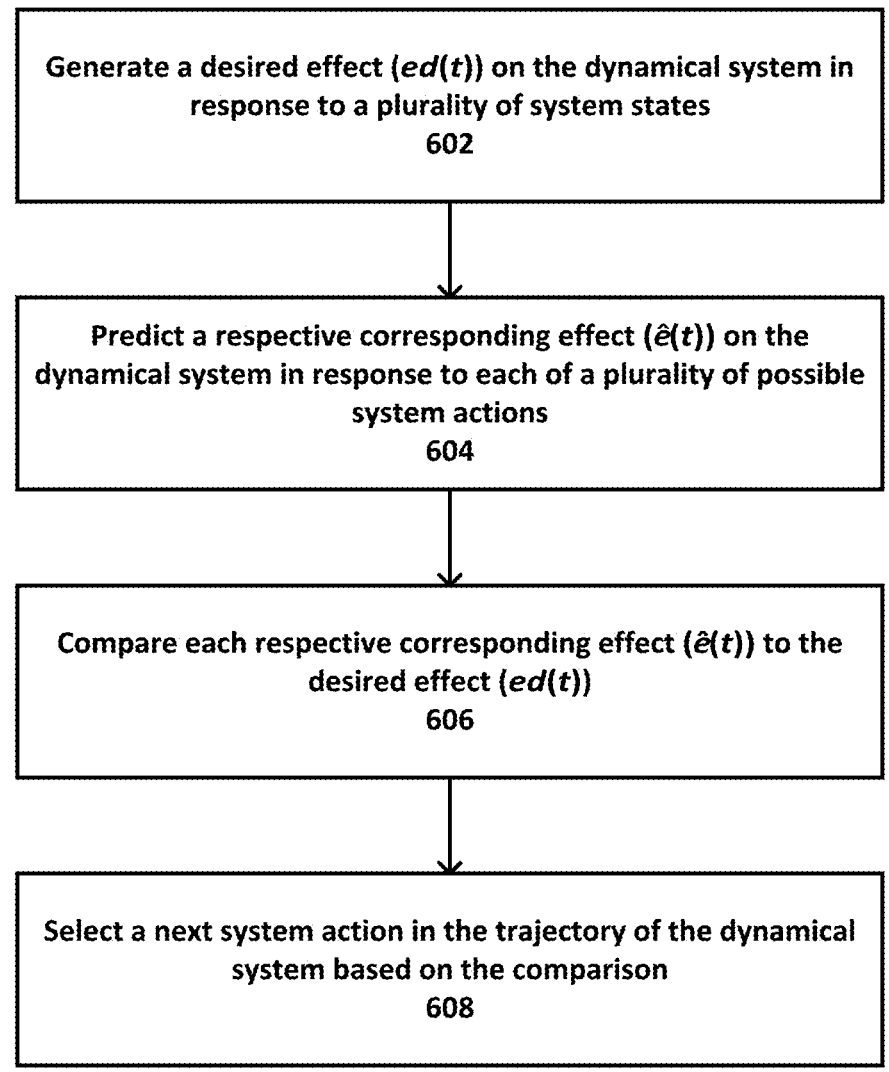
FIG. 6 is a flowchart illustrating another example method for generating a trajectory of a dynamical system according to an implementation described herein.
Figure 7:
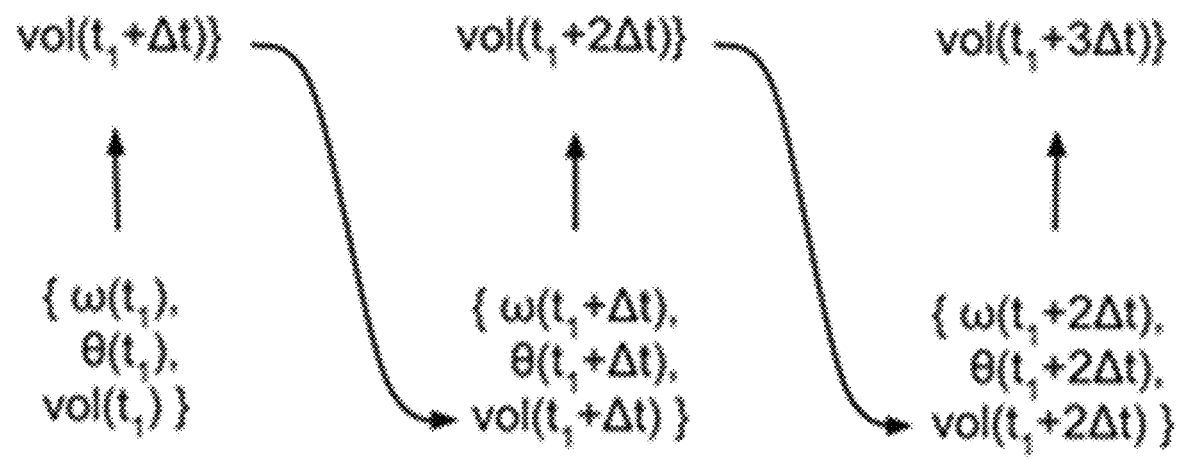
FIG. 7 illustrates an example sequential pouring system with the input being the current angular velocity and the current poured volume and the output being the poured volume for the next time step.

Referring now to FIG. 6, another example method for generating a trajectory of a dynamical system is described. As described above, the trajectory can include a plurality of sequential system states over time. Similarly to FIG. 1, this disclosure contemplates that the method for generating a trajectory of a dynamical system described with regard to FIG. 6 can be implemented using the artificial neural network(s), mixture density network(s), computing device(s) (e.g., computing device 500 shown in FIG. 5), and/or combinations thereof described below.

A system (e.g., a dynamical system such as a robotic system) that executes actions and by which causes effects is considered. The system proceeds sequentially from one time step to the next. At time step t−1, by executing a certain action, the system arrives at state x(t−1), and causes effect e(t−1). At time step t, the system executes action u(t), which transitions its state to x(t) and meanwhile causes effect e(t). The actions cause the effects through the nature of physical environment whose specific mechanism, which is assumed to be unknown. The system has no direct access to the effect, and it must execute an action if it intends to change the effect.

In the example, it is desired that the system is used to fulfill a task. The task is defined in the effect domain. The system is expected to find and execute a sequence of actions so that the resulted effects fulfill the task. As described herein, the system can be used to execute a pouring task, for example. Robotic systems configured to execute a pouring task are shown in the examples of FIGS. 3A-3C and 14.

As described below, the system is driven using "the desired effect". The desired effect $e_d(t)$ is defined at time step t to be the effect that the system is desired to result in by taking the appropriate action. Since no knowledge of the physical environment is assumed, it is not possible to calculate the action that will lead to $e_d(t)$. Nevertheless, the physical environment can be simulated using a model, and the model can be used to predict the effect e(t) of an action. Numerous different actions can be generated, the effect of each action can be predicted, and the action whose predicted effect is closest to the desired effect can be chosen.

The trajectory generation method described below can include three different parts. The first part (Part A) generates the desired effect $e_d(t)$, the second part (Part B) generates the action u(t), and the third part (Part C) predicts the corresponding effect ê(t) of an action. As described below, Part B is optional and can be used when the next system action cannot be accurately chosen using Parts A and C alone. The intuition is that the predicted effect of a candidate action is compared with the desired effect to evaluate the action. However, since each part contains uncertainty or error, it is not possible to trust the comparison alone to make a decision. Instead, to choose an action, the method considers how likely the desired effect is in part A, how likely the action is in part B, how likely the prediction is in part C. Additionally, the method considers how well the predicted effect meets the desired effect, all together.

Part A, the desired effect ($e_d(t)$) generation engine, can be modeled using a Gaussian distribution whose parameters depend on e(1:t−1):

$$e_d(t) \sim \mathcal{N}(\mu_A, \sigma_A; e(1:t-1)) \quad (16)$$

where e(1:t−1)={e(τ)/τ=1, 2, . . . , t−1} is the entire sequence of actual effects in history. For example, at step 602 in FIG. 6, a desired effect ($e_d(t)$) on the dynamical system in response to a plurality of system states and effects is generated. The desired effect is associated with a confidence value. Optionally, the desired effect on the dynamical system can be generated using a first recurrent mixture density network (RMDN). It should be understood that an RMDN is provided only as an example. This disclosure contemplates that any model that is capable of modeling time-dependent and multi-modal distributions can be used. For example, dynamical system based Gaussian mixture regression (GMR) can also be used. The first RMDN can be trained with demonstration data, e.g., using human demonstration data. Human demonstration data is described above and is therefore not described in further detail below. As described herein, the system can be used to execute a pouring task in one implementation. In this example, the input to the system (e.g., the system states) can include, but is not limited to, a characteristic of a pouring container (e.g., height, diameter, etc.), an initial volume in the container, a current volume in the container, a target pour volume, an amount poured, a rotation angle of the container, and/or an angular velocity of a motor. The desired effect ($e_d(t)$) is generated in response thereto.

Part C, the effect (ê(t)) prediction engine, can be modeled using a Gaussian distribution whose parameters depend on x(1:t−1), e(1:t−1), and u(t):

$$\hat{e}(t) \sim \mathcal{N}(\mu_C, \sigma_C; x(1:t-1), e(1:t-1), u(t)) \quad (17)$$

For example, at step 604 in FIG. 6, a respective corresponding effect (ê(t)) on the dynamical system in response to each of a plurality of possible system actions can be predicted. Each respective corresponding effect is associated with a confidence value. Optionally, the respective corresponding effects on the dynamical system can be generated using a second recurrent mixture density network (RMDN). The second RMDN can be trained with demonstration data, e.g., using human demonstration data. Human demonstration data is described above and is therefore not described in further detail below. This disclosure contemplates that the first and second RMDNs are different. It should be understood that an RMDN is provided only as an example. This disclosure contemplates that any model that is capable of modeling time-dependent and multi-modal distributions can be used, such as dynamical system based Gaussian mixture regression (GMR).

Then, at step 606 in FIG. 6, each respective corresponding effect (ê(t)) on the dynamical system can be compared to the desired effect ($e_d(t)$) on the dynamical system.

The loss of the action u(t) can be defined as the difference between the predicted effect ê(t) and the desired effect $e_d(t)$:

$$\mathcal{L}(u(t)) = d(\hat{e}(t), e_d(t)) = \frac{1}{\sqrt{2\pi(\sigma_A^2 + \sigma_C^2)}} \exp\left[\frac{(\mu_A - \mu_C^2)}{2(\sigma_A^2 + \sigma_C^2)}\right] \quad (18)$$

The derivation of the distance between two Gaussians is described below. When either $\sigma_A$ becomes zero, L(u(t)) is equivalent to the likelihood of $\mu_A$ evaluated by $N(\mu_C, \sigma_C)$. When $\sigma_C$ becomes zero, the situation is reversed, but in nature identical. One numerical concern is that when both $\sigma_A$ and $\sigma_C$ reaches zero, L(u(t)) reaches $+\infty$, which will cause overflow. When both $\sigma_A$ and $\sigma_C$ are significantly small, the variance can be ignored, and it is possible to fall back to using Euclidean distance to define the loss as: $L(u(t))=(\mu_A-\mu_C)^2$.

N different candidate actions $u^i(t)$, i=1, 2, . . . , N, can be selected from a reasonable range. The candidate actions can be referred to as samples or particles. Each sample $u^i(t)$ produces a predicted effect $\hat{e}^i(t)$ and a corresponding loss $L(u^i(t))=d(\hat{e}^i(t), e_d(t))$. The action whose loss has the lowest value is chosen to be executed:

$$u^*(t) = \underset{u^i(t)}{\arg\min} \mathcal{L}(u^i(t)), i = 1, 2, \ldots, N. \quad (19)$$

For example, the next system action in the trajectory of the dynamical system can be selected based on the comparison, which is shown by step 608 in FIG. 6.

The next system action can be transmitted to the dynamical system (e.g., the robotic system) for execution. For example, a command can be transmitted from a computing device to the dynamical system. As described herein, the system can be used to execute a pouring task in one implementation. In this example, the next system action can be a velocity such as the next angular velocity of the motor, which is transmitted to drive the motor that changes the rotation angle of the container. Executing the next system action (e.g., the optimal action) transitions the dynamical system in time and to a new state. The method illustrated by FIG. 6, steps 602-608 can then be repeated such that the dynamical system can execute a next system action and transition to the next system state.

In some cases, Parts A (e.g., FIG. 6, step 602) and Part C (e.g., FIG. 6, step 604) may generate a trajectory for the dynamical system with an insufficient level of accuracy. In these cases, Part B, the action (u(t)) generation engine, can be used in conjunction with the desired effect ($e_d(t)$) generation engine of Part A and the effect (ê(t)) prediction engine of Part C. For example, the possible system actions can be generated. The action generation engine can optionally be a simple action generator that outputs a single action (e.g., an action to be executed by the system) for a given time step. Optionally, the action generation engine generates actions with uniform probability within a defined range. In other words, the confidence value of different actions is assumed to be the same.

In some implementations, the possible system actions can be generated by a user. In other implementations, the possible system actions can be generated using a recurrent neural network (RNN) such as a scalar-output RNN. Optionally, the RNN can include a plurality of LSTM units (or gated recurrent units (GRUs)). In some implementations, at least one of the LSTM units is a peephole LSTM unit. Networks including LSTM units are described below, for example, with reference to FIGS. 8, 12 and 13. The RNN can be trained with demonstration data, e.g., using human demonstration data. Human demonstration data is described above and is therefore not described in further detail below. It should be understood that an RNN is provided only as an example. This disclosure contemplates that other machine learning algorithms can be used for the action generation engine.

Additionally, when the Parts A (e.g., FIG. 6, step 602) and Part C (e.g., FIG. 6, step 604) begin to operate with a sufficient level of accuracy, the action generation engine can be paused. In other words, the system can then execute the method illustrated by FIG. 6, steps 602-608 without input from an action generation engine (Part B).

The distance between two Gaussians is now described.

The probability density of $e_d(t)$ is $$p_A(e_d(t)) = \frac{1}{\sigma_A\sqrt{2\pi}} \exp\left[\frac{(e_d(t)-\mu_A)^2}{2\sigma_A^2}\right] \quad (20)$$

and the probability density of $\hat{e}^i(t)$ is $$p_C(\hat{e}^i(t)) = \frac{1}{\sigma_C\sqrt{2\pi}} \exp\left[\frac{(\hat{e}^i(t)-\mu_C)^2}{2\sigma_C^2}\right]. \quad (21)$$

The distance between $e_d(t)$ and $\hat{e}^i(t)$ is the distance between two Gaussians:

$$d(e_d(t), e^i(t)) = \int_{-\infty}^{+\infty} p_A(x)p_C(x)dx. \quad (22)$$

The product between two Gaussians $N(\mu_1, \sigma_1)$ and $N(\mu_2, \sigma_2)$ is calculated as:

$$p(x) = p_1(x)p_2(x) = \lambda\frac{1}{\sigma\sqrt{2\pi}}\exp\left[\frac{(x-\mu)^2}{2\sigma^2}\right] \quad (23)$$

$$\lambda = \frac{1}{\sqrt{2\pi(\sigma_1^2+\sigma_2^2)}}\exp\left[-\frac{(\mu_1-\mu_2)^2}{2(\sigma_1^2+\sigma_2^2)}\right] \quad (24)$$

$$\mu = \frac{\sigma_1+\sigma_2}{\sqrt{\sigma_1^2+\sigma_2^2}} \quad (25)$$

$$\sigma = \frac{\mu_1\sigma_2^2+\mu_2\sigma_1^2}{\sigma_1^2+\sigma_2^2}. \quad (26)$$

Thus Eq. 22 becomes Eq. 27-29:

$$d(e_d(t), e^1(t)) = \int_{-\infty}^{+\infty} p_A(x)p_C(x)dx \quad (27)\text{-}(29)$$

$$= \lambda \int_{-\infty}^{+\infty} \frac{1}{\sigma\sqrt{2\pi}}\exp\left[\frac{(x-\mu)^2}{2\sigma^2}\right]dx$$

$$= \lambda(\text{a Gaussian } PDF \text{ integrates to unity}).$$

Examples

Pouring is one of the most commonly executed tasks in human's daily lives and whose accuracy is determined by the trajectory of the angular velocities of the source container. In this work, an example system and method of pouring which generates the angular velocities of the source container based on recurrent neural networks is presented. We collected demonstrations of human pouring water, with which we trained the system. To evaluate the system, we made a physical system on which the velocities of the source container were generated at each time step and executed by a motor. The system poured water from five source containers that were not seen during training, and achieved a higher accuracy than human subject with certain source containers. We compared the data used for training and the records of the experiments and the comparison showed that the system described below generalized in the experiments. The system also poured oil and syrup. The accuracy achieved with oil is slightly lower but comparable with that of water.

An example system and algorithm for accurate pouring is described below. The system includes a network with long short-term memory (LSTM) units as described below. At every time step, the system generates the angular velocity of the source container. As described below, the system was evaluated on pouring water from six different source containers and pouring oil and syrup. The accuracy vary for pouring with different source containers and pouring different liquid, but it achieved high values for pouring with certain source containers and for pouring oil. Thus, the system described below is able to pour accurately, and the accuracy exceeds existing pouring methods that also exhibits adaptability. Additionally, the system is able to generalize to different source containers, and the system is able to generalize to liquid with different density and viscosity.

Problem Description and Approach

The amount of liquid can be represented using either weight or volume. Volume can be perceived visually, is commonly used for liquid and is intuitive for measuring liquid. In the example below, volume is used to represent the amount of liquid.

We define the task of accurate pouring as pouring the requested volume accurately from a source container to a receiving container. Initially there is certain volume of liquid in the source container. If the source container is full then as soon as it starts rotating, the liquid will come out. If the source container is not full then there is a time period during which the source container is rotating but no liquid comes out. After the liquid comes out, it goes into the receiving container where it then stays and therefore the poured volume can only increase and can never decrease. Depending on the liquid volume inside the source container, to stop the liquid from coming out, the source container has to either stop rotating or rotate back to a certain angle. However, even if the source container has stopped rotating or has been rotating back, the liquid may keep coming out and as a result the poured volume increases. The pouring process is sequential and the poured volume is determined by the trajectory of the rotation velocities of the source container. The pouring process as described above can be modeled as a discrete time series:

1: for $i$ in $(1,2,\ldots)$ do

2: $t=t_1+(i-1)\Delta t$

3: $\theta(t+\Delta t)=\theta(t)+\omega(t)\Delta t$

4: $\text{vol}(t+\Delta t)=F((\omega(\tau))_{\tau=t_1}^{t})$

5: end for where $t_1$ is the initial time instant, $\Delta t$ is the time interval, $\vartheta(t)$ and $\omega(t)$ are the rotation angle and angular velocity of the source container, respectively, vol(t) is the poured volume, $F(\bullet)$ denotes the pouring system. $(\omega(\tau))^t=(\omega(t_1),\ldots,\omega(t))$ is the sequence of velocities. The effect of the velocity $\omega(t)$ executed at time t is observed at the next time step, time $t+\Delta t$, and the effects are the next rotation angle $\vartheta(t+\Delta t)$ and the next poured volume vol($t+\Delta t$). The rotation angle, $\vartheta(t+\Delta t)$ is the numerical integration of the sequence of velocities $(\omega(\tau))t$ $r=t1$. The poured volume vol($t+\Delta t$) is the result of the sequence of velocities $(\omega(\tau))t$ acted through the pouring system $F(\bullet)$.

The pouring system $F(\bullet)$ is a complicated nonlinear time-variant system that can be affected by many factors including factors that change with time and static factors. For example, the pouring system can be:

$$\text{vol}(t+\Delta t)=F((\omega(\tau))_{\tau=t_1}^{t},d(t),H,s(h)|_{h=0}^{H},\text{vol}_{2pour}, \text{vol}_{total},T,\rho,\mu) \quad (30)$$

where:

d(t) is the translation vector from the tip of the source container to the center of the mouth of the receiving container at time t, H is the height of the source container, s(h) is the evolution of s(h) from h=0 through h=H where s(h) is the shape of the cross-section of the source container at height h, $\text{vol}_{total}$ is the total volume of liquid in the source container before pouring, $\text{vol}_{2pour}$ is the volume to pour, i.e. the target volume, T is the temperature, $\rho$ is the density of the liquid at temperature T, and $\mu$ is the viscosity of the liquid at temperature T.

Among the factors, $(\omega(\tau))^t$ and d(t) change with time and the others are static. The factors above are provided only as examples. This disclosure contemplates that there may be other factors that affect pouring.

The angular velocity $\omega(t)$ is the action that pushes the pouring process forward. To perform pouring, we need to generate the angular velocity $\omega(t)$. The generator needs to take the target volume as input. It also needs to be sequential. At any time step during pouring, the generator should take the current poured volume as input, compare it with the target volume, and adjust the velocity accordingly. The generator is represented as:

$$\omega(t)=G((\omega(\tau))_{\tau=t_1}^{t-\Delta t},\text{vol}(t),\text{vol}_{2pour}), \quad (31)$$

where $G(\bullet)$ denotes the generator and $\text{vol}_{2pour}$ is the target volume. With the velocity generator represented, the pouring process is written again as:

1: for $i$ in $(1,2,\ldots)$ do

2: $t=t_1+(i-1)\Delta t$

3: $\omega(t)=G((\omega(\tau))_{\tau=t_1}^{t-\Delta t},\text{vol}(t),\text{vol}_{2pour})$ 4: $\theta(t+\Delta t)=\theta(t)+\omega(t)\Delta t$ 5: $\text{vol}(t+\Delta t)=F((\omega(\tau))_{\tau=t_1}^{t})$ 6: end for

RNN for Velocity Generation

A natural solution for velocity generation of pouring is Model Predictive Control (MPC), which optimizes control inputs based on their corresponding predicted future outcomes. However, using MPC for pouring requires that we know the pouring system F(•) so that we can perform predictions of future outcomes of candidate velocities. Since an accurate F(•) is difficult to obtain, we cannot readily use MPC and need to turn to other solutions.

As described below, a model for velocity generation is identified, and the parameters of the model are learned from human demonstrations. Optionally, it is desirable that the model for velocity generation (1) be inherently capable of dealing with sequences because all data are sequences and (2) be able to learn effectively with variable lengths of sequences because human demonstrations vary in length.

We use RNN to model the velocity generator. RNN is a class of neural networks that is designed to process its inputs in order. It feeds its output from one time step into its input to the next time step, shown specifically in Eq. (32) where x(t) is the given input, h(t−1) and h(t) are output from the previous and at the current step. The weight W and bias b are learned using Backpropagation Through Time.

$$h(t) = \tan h(W[h(t-1), x(t)]^T + b) \quad (32)$$

Figure 8:
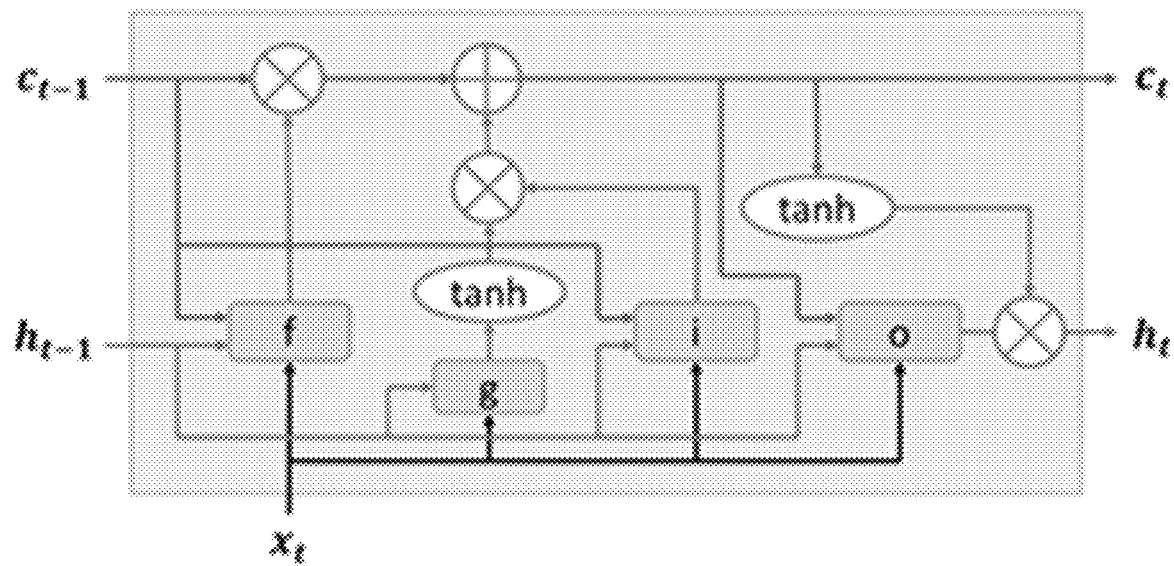
FIG. 8 is a block diagram illustrating an example peephole LSTM unit.

The plain RNN as shown in Eq. (32) suffers from the problems of vanishing and exploding gradients, which prevents it from learning long-term dependencies effectively. The problem was solved by long short-term memory (LSTM) which introduces gates and memory cells. Optionally, peepholes are introduced to LSTM to enable the access of all gates to the memory cell. This disclosure contemplates that gated recurrent units (GRUs) can be used. GRUs are gating mechanisms used in RNNs and are similar to LSTM units. The mechanism of peephole LSTM is illustrated in FIG. 8 and is written as:

$$i = \text{sigm}(W_i[h(t-1), x(t)]^T + b_i + p_i \odot c(t-1)) \quad (33)$$

$$f = \text{sigm}(W_f[h(t-1), x(t)]^T + b_f + p_f \odot c(t-1)) \quad (34)$$

$$g = \tan h(W_g[h(t-1), x(t)]^T + b_g) \quad (35)$$

$$c(t) = f \odot c(t-1) + i \odot g \quad (36)$$

$$o = \text{sigm}(W_o[h(t-1), x(t)]^T + b_o + p_o \odot c(t)) \quad (37)$$

$$h(t) = o \odot \tan h(c(t)) \quad (38)$$

where i, o, and f are the input, output, and forget gates respectively. c is the memory cell. $p_i$, $p_o$, and $p_f$ are the peephole connection weights for gate i, o and f, respectively. Sigm represents the sigmoid function and is used to implement gates. ⊙ represent element-wise multiplication. In the example below, peephole LSTMs are used to model the velocity generator.

Input Features

We need to decide the input features to the RNN at any time step. Each feature corresponds to a type of data. We write Eq. (31) again below for convenience, i.e., Eq. (31) and (39) are the same:

$$\omega(t) = G((\omega(\tau))_{\tau=t_1}^{t-\Delta t}, \text{vol}(t), \text{vol}_{2pour}) \quad (39)$$

The first feature is the sequence of velocities $(\omega(\tau))^{t-\Delta t}$. $\vartheta(t)$ is the numerical integration of the sequence of velocities and therefore we identify $\vartheta(t)$ as the first feature. The second feature is the current poured volume vol(t). The third feature is the target volume $\text{vol}_{2pour}$. Thus we have set all three parameters in Eq. (31) as features.

Corresponding to the target volume $\text{vol}_{2pour}$, the initial volume of liquid in the source container $\text{vol}_{total}$ can be set as a feature. We can also have features that describe the shape of the source container. We model the source container as a cylinder and set both the height h and the body diameter d as features.

Figure 9:
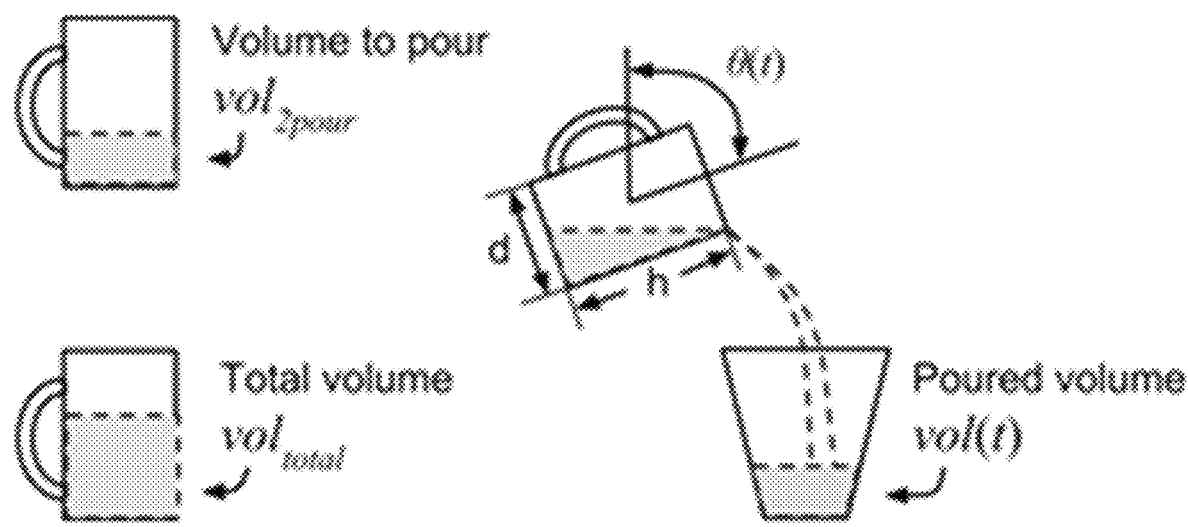
FIG. 9 illustrates an example illustrative pouring scene that shows the six physical quantities to obtain. $vol2_{pour}$ and $vol_{total}$ are the target and initial volume, respectively. d and h are the diameter and height of the source container, respectively. $\vartheta(t)$ and $vol(t)$ are the sequences of rotation angle and of the poured volume, respectively.

The four static features $\text{vol}_{2pour}$, $\text{vol}_{total}$, h, and d describe a pouring task and distinguishes one task from another. The two sequential features $\vartheta(t)$ and vol(t) are the results of executing the task described by the four static features. FIG. 9 illustrates the six input features.

Data Collection for Training

We wanted to collect all the input features that we have identified for the network and we needed to decide how to measure volume. Intuitively, the volumes $\text{vol}_{total}$, $\text{vol}_{2pour}$ can be measured using a measuring cup. However, obtaining vol(t) using a measuring cup requires a real-time video stream of the measuring cup and a computer vision algorithm that extracts the volume from the video stream.

To simply the problem that we have to solve, we decided that we would not include the above vision problem in our solution, and instead we computed the volume from other quantities. The volume is mass m divided by density ρ, i.e. v=m/ρ. We consider weight which is the gravitational force acted on an object that keeps the object in place. The weight f is the product of mass m and gravitational acceleration g, i.e. f=mg. Thus volume can be calculated from weight:

$$v = \frac{f}{\rho g}, \quad (40)$$

and therefore can be represented by weight. We represent $\text{vol}_{total}$ by its corresponding weight $f_{total}$, $\text{vol}_{2pour}$ by weight $f_{2pour}$, and similarly the current poured volume vol(t) by weight f(t).

Figure 10:
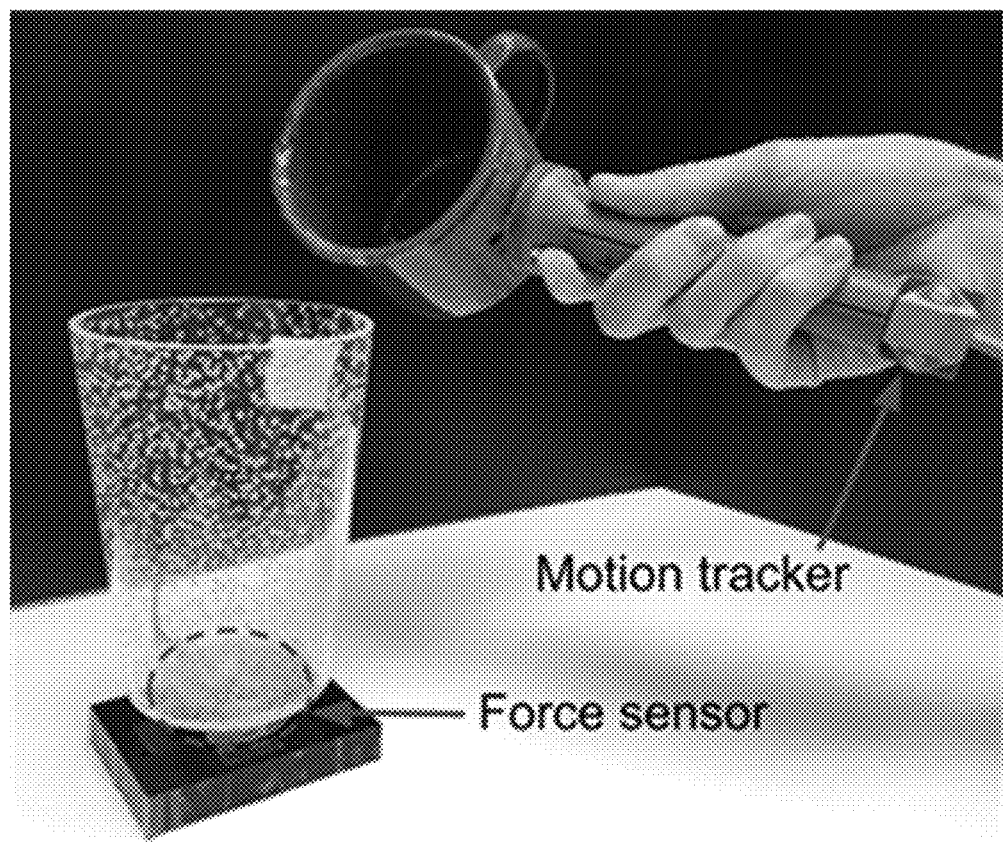
FIG. 10 illustrates an example data collection setup. The source container is connected to the motion tracker through a 3-D printed adapter. The force sensor is placed underneath the receiving container.
Figure 11:
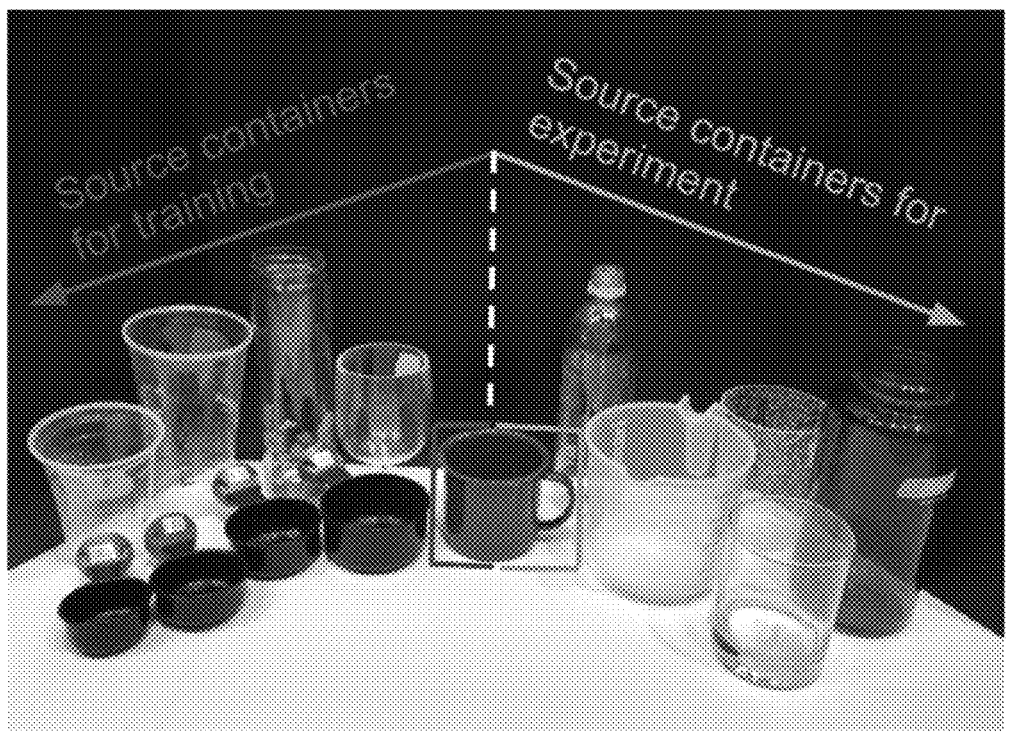
FIG. 11 illustrates the source containers used in training and in the experiments. The left half labeled as red were used for training and the right half labeled as green were used for experiments. The red cup in the middle was used both for training an experiments.

FIG. 10 illustrates the setup for our data collection. We collected data of pouring water from 9 different source containers into the same receiving container. The nine source containers are shown as the left half of FIG. 11. We measured h and d of each source container in millimeter using a ruler. We 3D-printed a handle where the source container was mounted on one end, and a Polhemus Patriot motion tracker was mounted on the other end. The motion tracker recorded the rotating angles $\vartheta(t)$'s of the source container in degrees. We placed a force/torque sensor (e.g., an ATImini40 force/torque sensor) under the receiving container to record the raw force reading $f_{raw}(t)$'s in pound-force (lbf). We obtained $f_{total}$ and $f_{2pour}$ from $f_{raw}(t)$. In each trial, $f_{total} > f_{2pour}$, that is, there was water left in the source container after pouring.

$\vartheta(t)$'s were recorded at 60 Hz and $f_{raw}(t)$'t were recorded at 1 KHz. The collected pouring data is part of RPAL daily interactive manipulation dataset.

Implementation

The network can have multiple layers and each layer can contain multiple peephole LSTM units. RNN Dropout is applied between layers. The final layer is a fully connected layer with linear activation which generates the angular velocity. The mechanism of the network with L layers at time t is represented as:

1: $h_0(t) = x(t)$

2: for $i = (1, 2, \ldots L)$ do

3: $h_i(t) = \text{LSTM}((h_i(t-1), h_{i-1}(t); n_{unit})$

4: $h_i(t) = \text{Dropout}((h_i(t); p_{keep})$

5: end for

Figure 12:
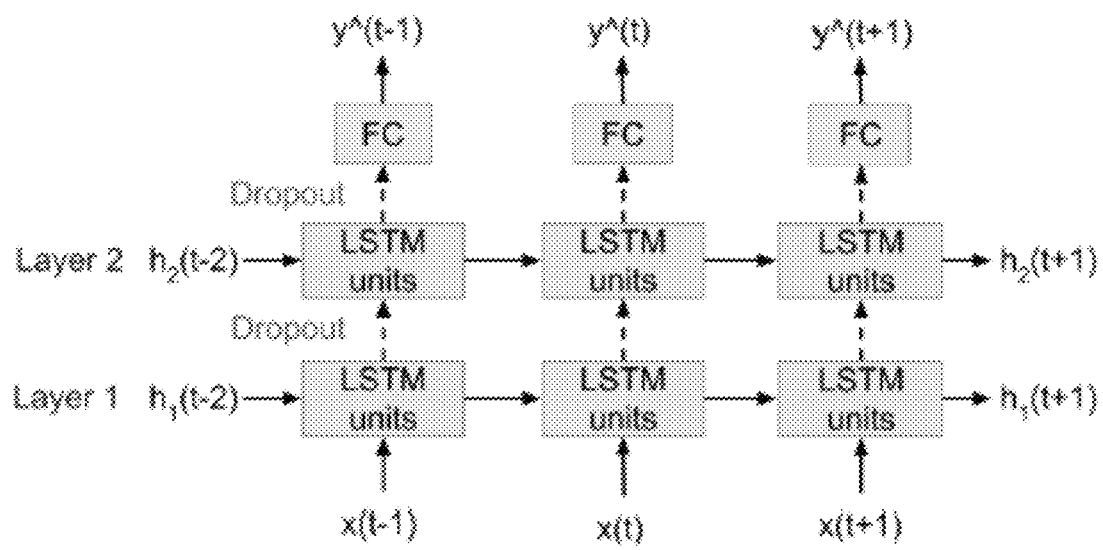
FIG. 12 illustrates an example of the network with two LSTM layers and the final layer.

6: $\hat{y}(t) = W_y h_L(t) + b_y$ where LSTM(•;$n_{unit}$) means LSTM block with $n_{unit}$ units, and Dropout(•;$p_{keep}$) means dropout with a keep probability of $p_{keep}$. FIG. 12 illustrate the network with two LSTM layers and the final layer.

To feed the input features into the network, we group them into a vector $x(t)=[\vartheta(t),f(t),f_{total}, f_{2pour}, h, \kappa]^T$ for $t=1, \ldots, T-1$, where T is the length of the trial and
1) $\vartheta(t)$ is the rotating angle of the source container,
2) f(t) is the weight of the poured liquid,
3) $f_{total}$ is the weight of the initial amount of liquid present in the source container before pouring,
4) $f_{2pour}$ is the weight of the target liquid amount,
5) h is the height of the source container, and
6) $\kappa$ is the body curvature of the source container.

The body curvature $\kappa$ of the source container is calculated from the body diameter, d:

$$\kappa=2/d \tag{41}$$

The angular velocities $\omega(1:T-1)$ are computed from $\vartheta(1:T)$:

$$\omega(t)=(\theta(t+1)-\theta(t))f_s, t=1,2,\ldots,T-1 \tag{42}$$

where $f_s$ is the sampling frequency of $\vartheta(t)$. For each trial, at time $t \in [1, 2, \ldots, T-1]$, the input x(t) and target y(t) of the network are:

$$x(t)=[\theta(t),f(t),f_{total},f_{2pour},h,\kappa]^T \tag{43}$$

$$y(t)=\omega(t) \tag{44}$$

The output of the network is denoted by $\hat{y}(t)$. Assume we have N trials in total, and each trial has length $T_i$, $i \in [1, 2, \ldots, N]$. The loss function is defined as:

$$c = \frac{1}{N}\sum_{i=1}^{N}\frac{1}{T_i-1}\sum_{t=1}^{T_i-1}(\hat{y}_i(t)-y_i(t))^2. \tag{45}$$

Data Preparation and Training

We set the sampling frequency $f_s=60$ Hz since it is the lower one between the frequencies of $\vartheta(t)$ and $f_{raw}(t)$. We kept the recorded $\vartheta(t)$'s intact and downsampled $f_{raw}(t)$ to 60 Hz. We obtain f(t) by filtering the raw reading from the force sensor $f_{raw}(t)$, specifically:

$$f_m(1:t) \leftarrow \text{median\_filter}(fraw(1:t)), \text{window\_size}=5, \tag{46}$$

$$f(t) \leftarrow \text{Gaussian\_filter}(f_m(1:t)), \sigma=2, \tag{47}$$

We normalize each input dimension independently using the mean and standard deviation of that dimension.

Our network had 1 layer and 16 LSTM units. We trained models with different numbers of layers and LSTM units and we found the model with 1 layer and 16 units had a simple structure and performed well. It should be understood that a network with 1 layer and 16 LSTM units is provided only as an example and that other network configuration can be used. We set the keep probability of dropout to be 0.5. Specifically, the computation for time step t is represented as:

$$h(t)=\text{LSTM}(h(t-1),x(t)) \tag{48}$$

$$h_d(t)=\text{Dropout}(h(t)) \tag{49}$$

$$\hat{y}(t)=W_y h_d(t)+b_y \tag{50}$$

Figure 13:
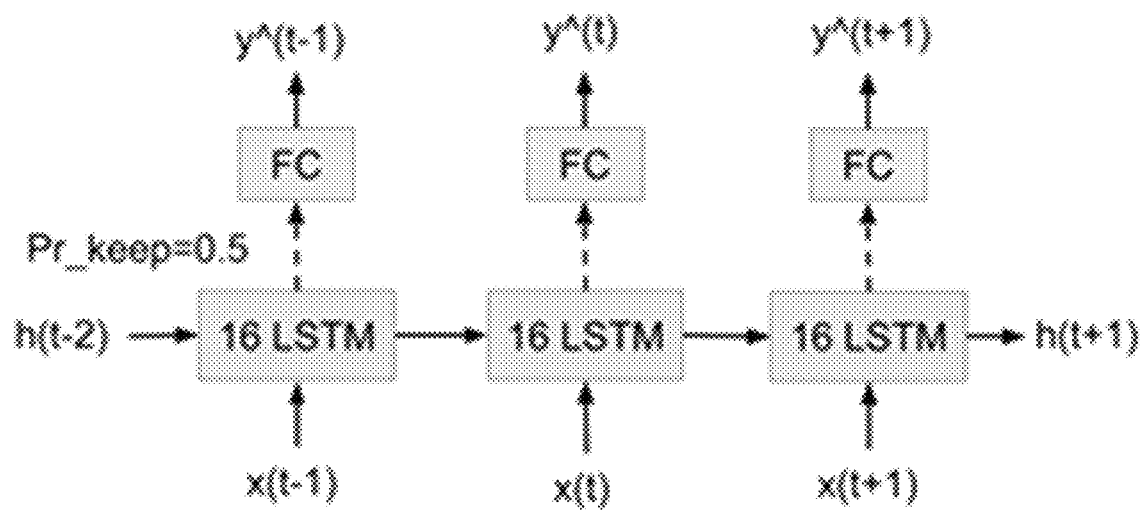
FIG. 13 illustrates an example network with 1 layer and 16 peephole LSTM units. Dropout with a keep probability of 0.5 is applied to non-sequential connections.

The network is shown in FIG. 13.

Learning the network involved 284 trials in total, among which 221 were for training and 63 for validation. Each iteration is an epoch, in which the entire training and validation data were traversed. We trained the network for 2000 iterations/epochs, and picked the model that has the lowest validation loss. We used the Adam optimizer and set the initial learning rate to be 0.001. The code was written using TensorFlow.

Physical System for Evaluation

Figure 14:
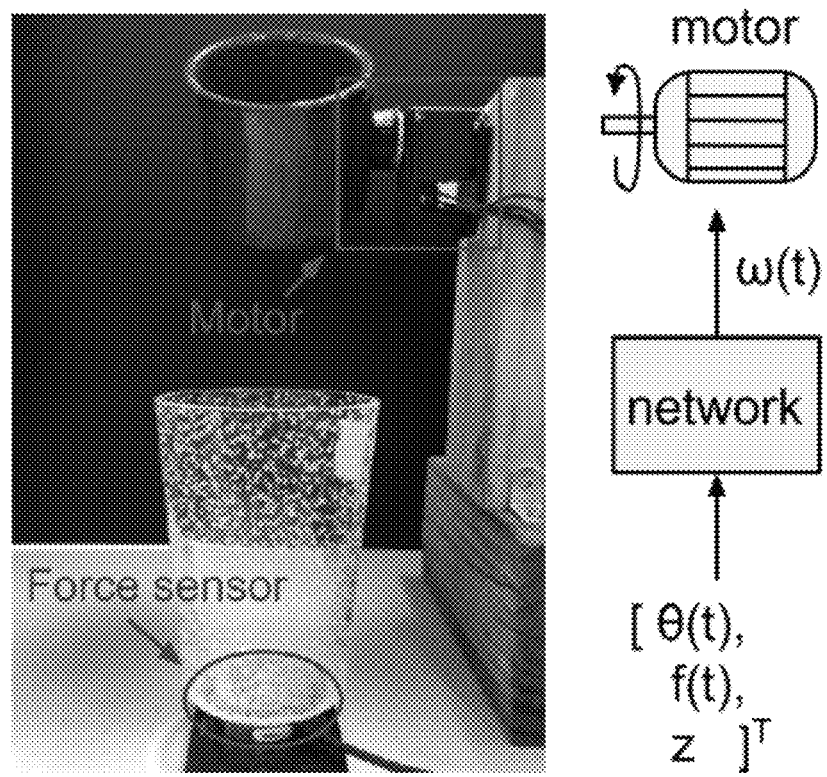
FIG. 14 illustrates the physical system and model. The physical system, which is shown on the left, consists of a motor that executes the generated velocity command and a force sensor that monitors the poured amount. The source containers are attached to the motor through a 3-D printed adapter. As shown on the right, before pouring, the static features z=[ftotal, f2pour, h, κ] are obtained. At time step t, the physical system obtains $\vartheta(t)$ and f(t), combine them with z, and send to the network. The network generates velocity command ω(t) which is executed by the motor.

To evaluate our approach, we made a physical system that consists of the trained network, a Dynamixel MX-64 motor and the same force sensor with which we collected the data. The motor was placed at a certain height above the surface, and the force sensor was placed on the surface close by. The source container was attached to the motor and the receiving container was placed on top of the force sensor. We placed the receiving container (along with the force sensor) properly according to the particular source container used so that there was little spilling. FIG. 14 (Left) shows the setup of the physical system (e.g., a robotic system, which is configured to execute a pouring task).

The physical system runs at 60 Hz, same as the data collection. The time between consecutive time steps is $\Delta t=0.016$ seconds. Before performing each separate pouring trial, we obtain the four static features which we denote by $z=[f_{total}, f_{2pour}, h, \kappa]$. During the trial, at time step t, we obtain $\vartheta(t)$ from the motor and f(t) from the force sensor, and we feed the input features $x(t)=[\vartheta(t),f(t),z]^T$ to the network. The network generates velocity $\omega(t)$. The motor executes the velocity. The above process repeats at time step $t+\Delta t$. FIG. 14 (Right) shows the working process of the physical system at time t.

In the same way as was done in training, the physical system:
1) normalized every input dimension; and
2) obtained f(t) by filtering the raw force reading.

Experiments and Evaluation

We evaluated the system by testing it on pouring certain kinds of liquid from certain source containers. The difficulty of the task changes when the liquid and the source container changes. For each pair of liquid and source container, the system poured 15 times, each time with arbitrary $vol_{total}$ and $vol_{2pour}$ where $vol_{total} > vol_{2pour}$. We show the pouring accuracy of a pair of liquid and source container using a figure, in which we plot the actual poured volume against the target volume for all 15 trials. We also compute the mean and standard deviation of the pouring error: $\mu_e$ and $\sigma_e$ in milliliters and show them together with the liquid type in the figure. By the side of the actual-vs-target figure, we show the source container that was used.

Computing the volume from force requires the density of the liquid $\rho$ and the gravitational acceleration g. We used 0.997 g/mL for the density for water and 9.80665 m/s² for gravitational acceleration.

Figures 15C, 15F:
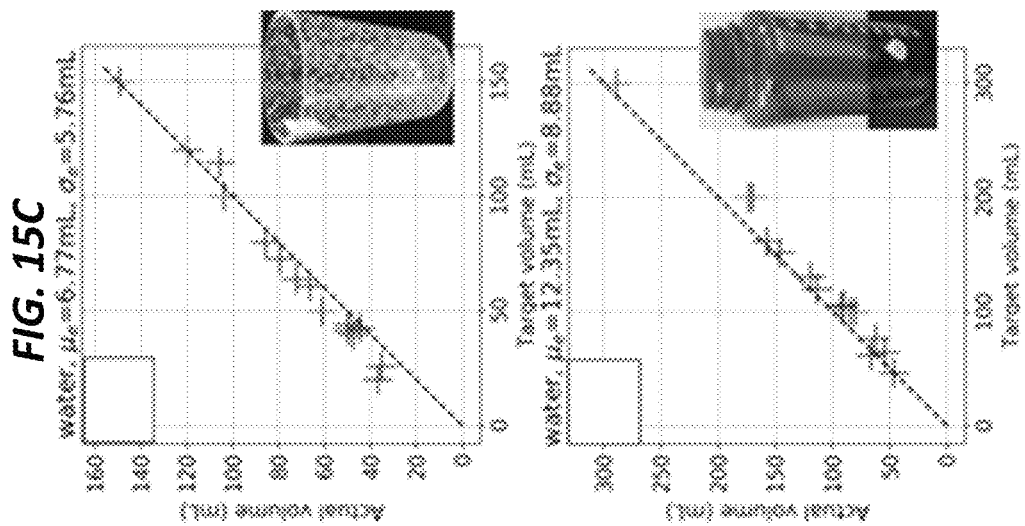
FIGS. 15A-15F illustrate actual-vs-target comparison of pouring water using (FIG. 15A) red cup, which is used for training, (FIG. 15B) slender bottle, (FIG. 15C) cup with bubble pattern (also referred to as the "bubble cup"), (FIG. 15D) glass cup, (FIG. 15E) measuring cup, and (FIG. 15F) fat bottle.
Figures 15B, 15E:
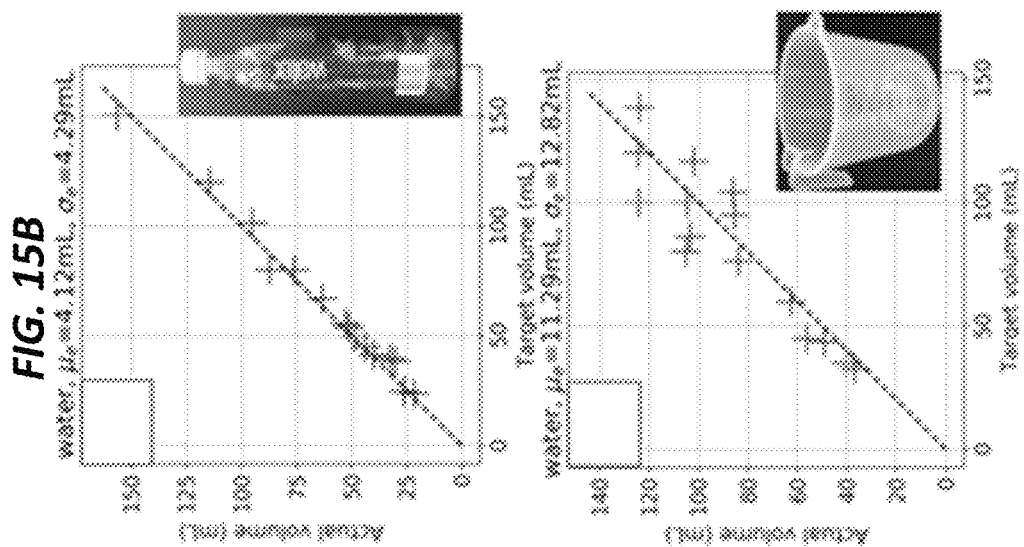
Figures 15A, 15D:
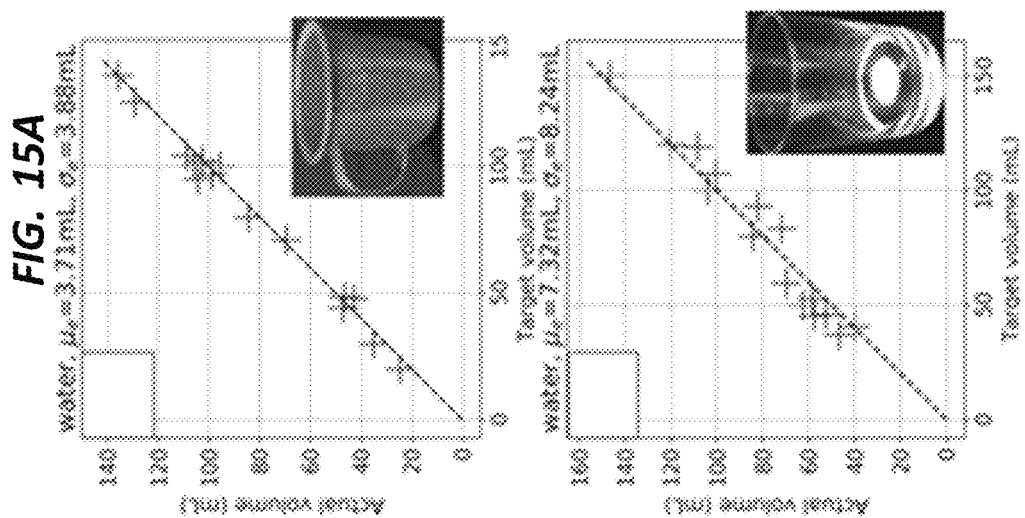

We started with the task that has the lowest difficulty and tested the system on pouring water from the red cup that has been used for training. FIG. 15A shows that the accuracy was high, indicating that the learning was successful. Then we increased the difficulty of the tasks and tested the system on pouring water from five different source containers that have not been used for training. The accuracy is shown in FIGS. 15B-15F, which we show in an increasing order of the error mean $\mu_e$. Compared with the accuracy of using the red cup, the accuracy of using the five unseen source containers is lower, which is within expectation. It is worth noting that although lower than the accuracy of the red cup, the accuracy of the slender bottle (FIG. 15B) is still high and is comparable with that of the red cup.

Table I (FIG. 26A) summarizes the mean and standard deviation of the errors, $\mu_e$ and $\sigma_e$, in milliliters of the system pouring water from different source containers. The table is ordered in an increasing order of the error mean $\mu_e$.

Figure 16:
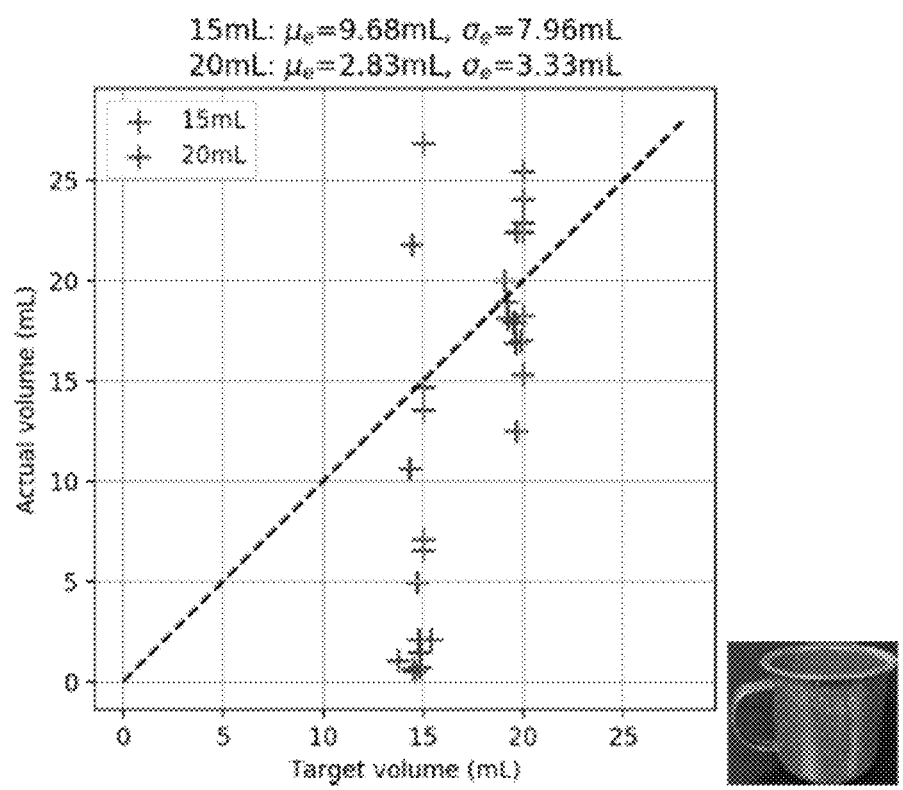
FIG. 16 illustrates actual-vs-target comparison of pouring 15 mL and 20 mL of water using the red cup.

Having evaluated the accuracy of system pouring different but relatively large amount of water, and we would like to know the minimum volume that the system could pour accurately. Therefore we made the system use the red cup to pour 20 mL and 15 mL, respectively, each for 15 times, and FIG. 16 shows the accuracy. Both $\mu_e$ and $\sigma_e$ for pouring 20 mL are lower than those of pouring larger volume with the red cup (FIG. 15A). The accuracy of pouring 15 mL is much lower than that of pouring 20 mL and those of pouring larger volume. Thus, 20 mL was the minimum volume that the system was able to pour accurately.

Figures 17A, 17B:
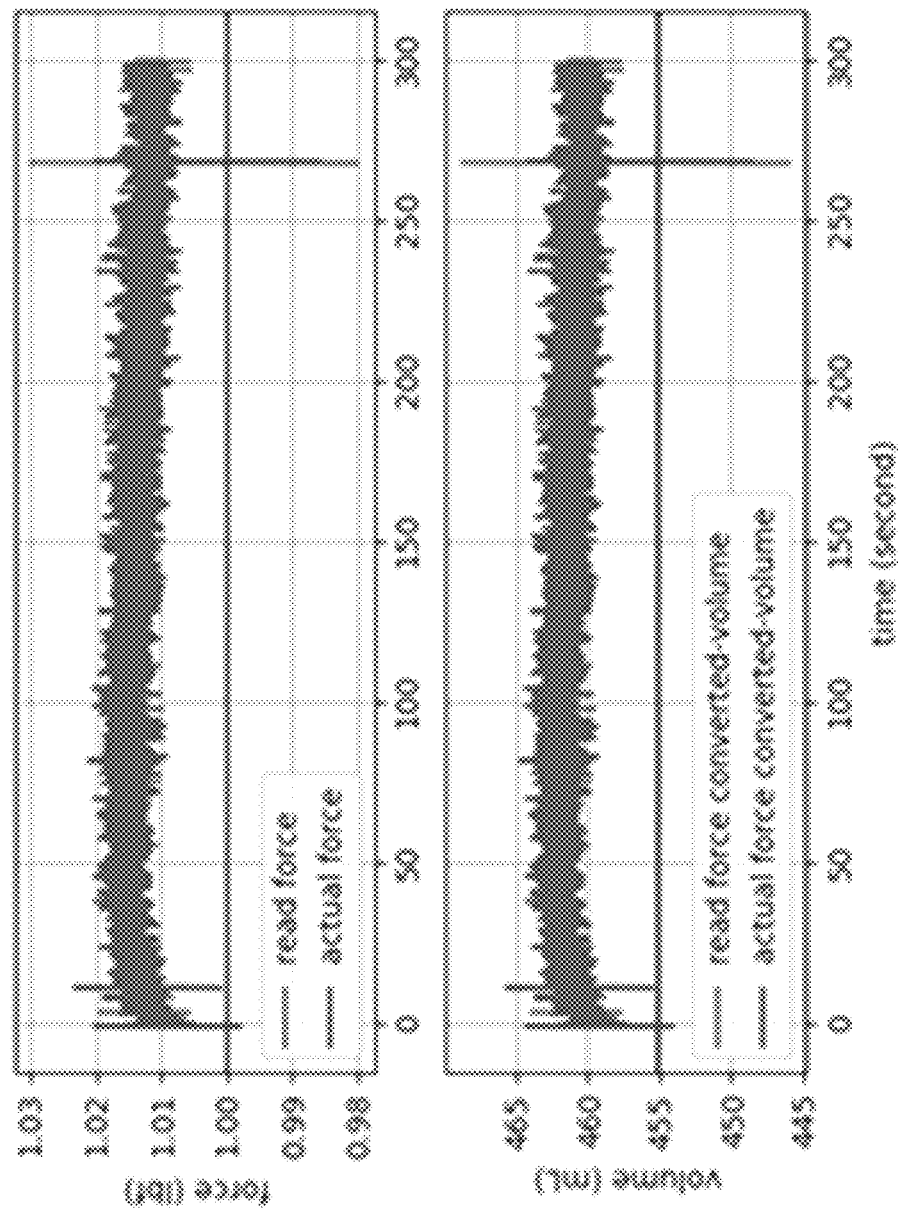
FIGS. 17A-17B illustrate readings of the force sensor for a weight of 1.0 lbf taken during 300 seconds (FIG. 17A) and the volume converted from force (FIG. 17B).

In FIG. 17A, we plot the reading of the force sensor for a 1.0-lbf weight during 300 seconds. In FIG. 17B, we also show the water volume converted from force. For a 1.0-lbf weight, the force sensor has a nonlinearity error of around 0.01 lbf, which is 1% of 1.0 lbf. The corresponding error in volume is around 5 mL.

Figure 18:
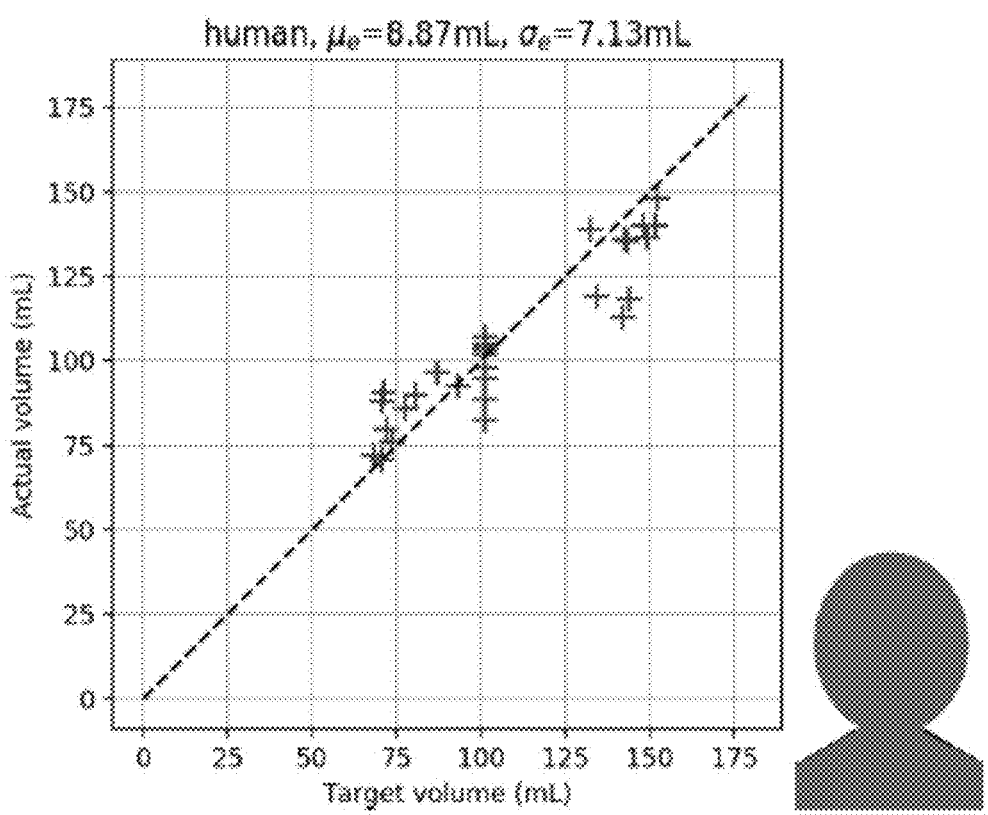
FIG. 18 illustrates actual-vs-target comparison of one human subject pouring water.

To have a sense of how accurately the system pours compared with human, we had a human subject pour water to variable target volume more than 15 times and the accuracy is shown in FIG. 18. We found that for pouring water with the red cup (FIG. 15A), with the slender bottle (FIG. 15B), and with the bubble cup (FIG. 15C), the system described in this example achieved a higher accuracy than human.

Generalization Analysis

Above, we showed that the system described in this example was able to pour with source containers that were not included in training, which showed that the system could generalize the pouring skill to different source containers.

Below, we analyzed the generalization of the system by comparing each experiment with the data. To be specific, we compared the records of the static features and of the dynamic features of each experiment with those of the data, respectively.

Figure 19:
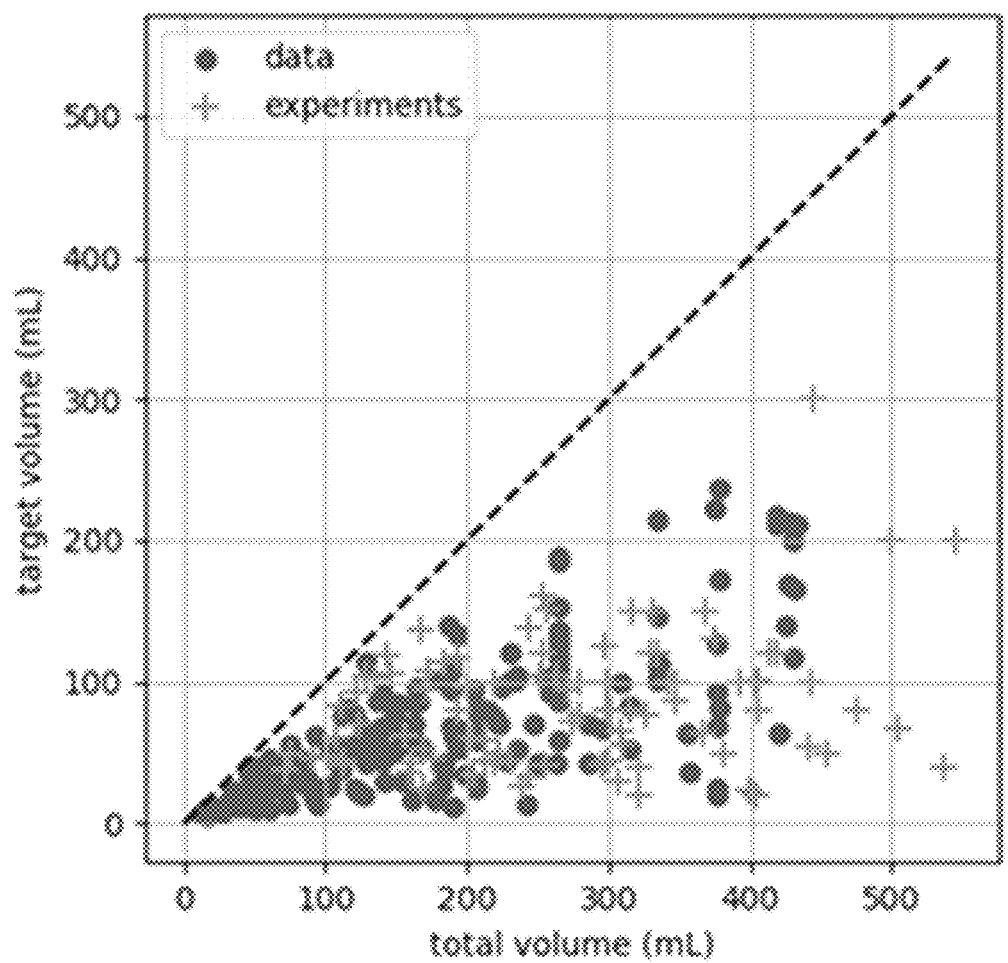
FIG. 19 illustrates pairs of initial and target force for every trial in the training data as well as the experiments.
Figure 20:
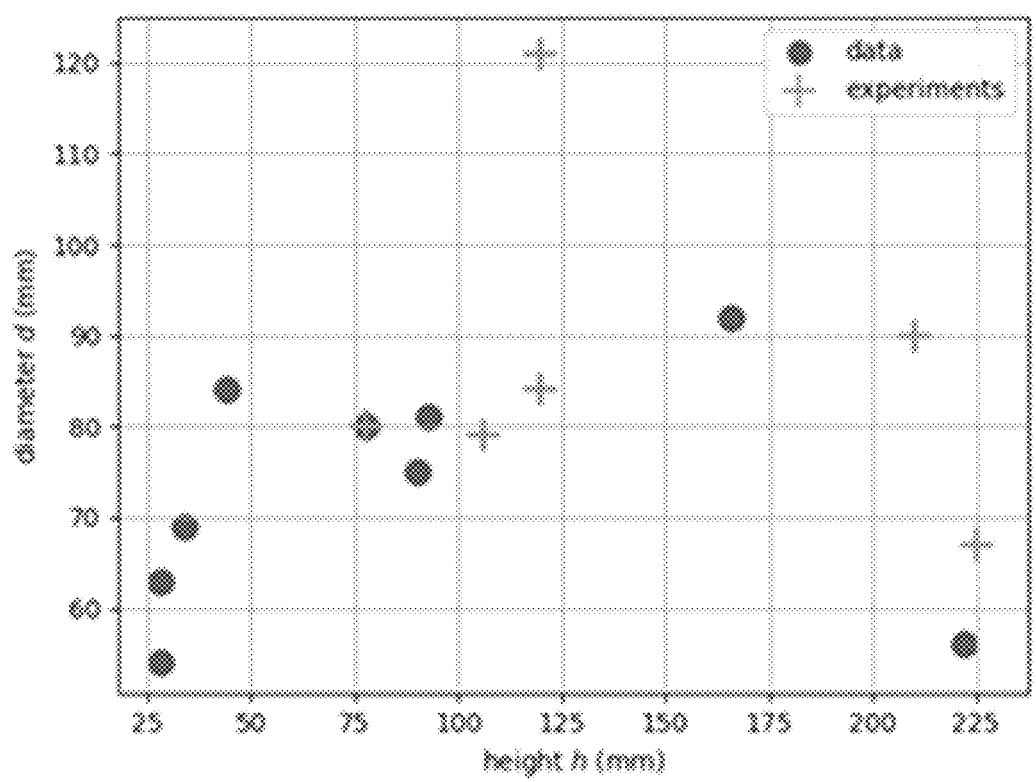
FIG. 20 illustrates comparisons of normalized histograms of minimum static distances.

First we compare the variation of the static features directly. In FIGS. 19 and 20 we show $vol_{2pour}$-vs-$vol_{total}$ and d-vs-h contained in the training data and all the experiments. In FIG. 19, all the records reside below the diagonal line which represents emptying the source container. This verifies what we said previously that $vol_{2pour} < vol_{total}$ for both data and experiments. FIG. 20 shows that in the experiment the heights lie within the range of the data but the diameter reaches a high value (above 120 mm) that the data do not contain.

Then we investigated the static features more thoroughly. The four static input features, $f_{total}$, $f_{2pour}$, h, and $\kappa$ specify how each time of pouring as a task differs from others. The four static features can each be normalized as done in training and put together as a 4-vector. We refer to the normalized 4-vector as the static vector. A trial is specified by a single static vector $v \in R^4$. We use the Euclidean distance between the static vectors of two trials to quantify the difference between the two trials, which we refer to as the static distance.

We want to compare the training data with the experiment of each pouring container to see how much the system generalizes. We represent each trial in the training data by:

$$a_i = \min(\{\|v_i - v_j\|\}_{j=1 \ldots N, j \neq i}), i=1, \ldots, N \quad (51)$$

which is the minimum among the static distances between trial i and all the other trials, N is the number of trials in the training data. We represent each trial in an experiment by:

$$b_i = \min(\{\|v_i - v_j\|\}_{j=1 \ldots N}), i=1, \ldots, M \quad (52)$$

which is the minimum among the static distances between trial i and all the trials in the training data, M is the number of trials in the experiment.

For each experiment, we plot the histogram of $a_i$'s for the training data together with the histogram of $b_i$'s for the experiment. We show the histograms in FIGS. 21A-21F. In FIGS. 21A, B, C, the histogram of the experiment is within the histogram of the data, which means the tasks have been learned and the system described in this example did not generalize. In FIG. 21D, the histogram of the experiment has a small overlap with that of the data but also extends to a minimum static distance as far as twice the width of the distance coverage in the data. The system described in this example generalized to a certain degree. In FIGS. 21E and F, the experiment histogram is outside that of the data and reached to a certain distance from the data. The system described in this example was able to execute tasks that have not been learned, and therefore generalized.

Similarly to the static features, we compare the two sequential features $\vartheta(t)$ and f(t) of the data with those of the experiments. The $\vartheta(t)$'s and f(t)'s of a trial result from executing a task that is specified by a particular static vector v, and they represent the specific solution given by the system to fulfill that task. We consider $\vartheta(t)$ and f(t) as a single sequence s={s(1),s(2), . . . ,s(T)} where s(t)=[$\vartheta(t)$,f(t)]$^T \in R^2$ and T is the length of the sequence. We normalize both $\vartheta(t)$ and f(t) as was done for the training. Corresponding to the static vector, we refer to the normalized sequence s as the dynamic sequence.

We represent the distance between two sequences $s_i$ and $s_j$ using the normalized distance computed by dynamic time warping (DTW), denoted as $d_{DTW}(s_i,s_j)$. Similarly to the static vectors, for dynamic sequences, we represent each trial in the training data by:

$$p_i = \min(\{d_{DTW}(s_i,s_j)\}_{j=1 \ldots N, j \neq i}), i=1, \ldots, N \quad (53)$$

which is the minimum among the normalized DTW distances between trial i and all the other trials, N is the number of trials in the training data. We represent each trial in an experiment by:

$$q_i = \min(\{d_{DTW}(s_i,s_j)\}_{j=1 \ldots N}), i=1, \ldots, M \quad (54)$$

which is the minimum among the normalized DTW distances between trial i and all the trials in the training data, M is the number of trials in the experiment.

Figures 22A, 22B, 22C:
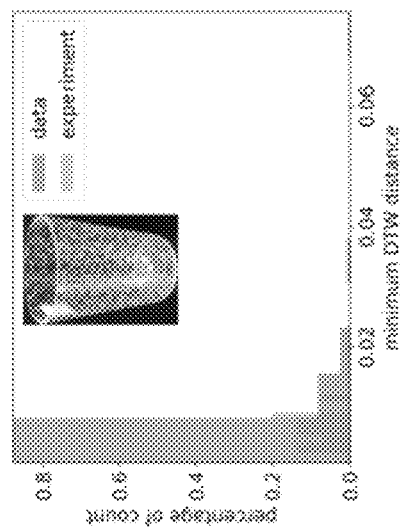
FIGS. 22A-22F illustrate comparisons of normalized histograms of minimum DTW distances for (FIG. 22A) red cup, (FIG. 22B) measuring cup, (FIG. 22C) bubble cup, (FIG. 22D) glass cup, (FIG. 22E) slender bottle, and (FIG. 22F) fat bottle.
Figures 22D, 22E, 22F:
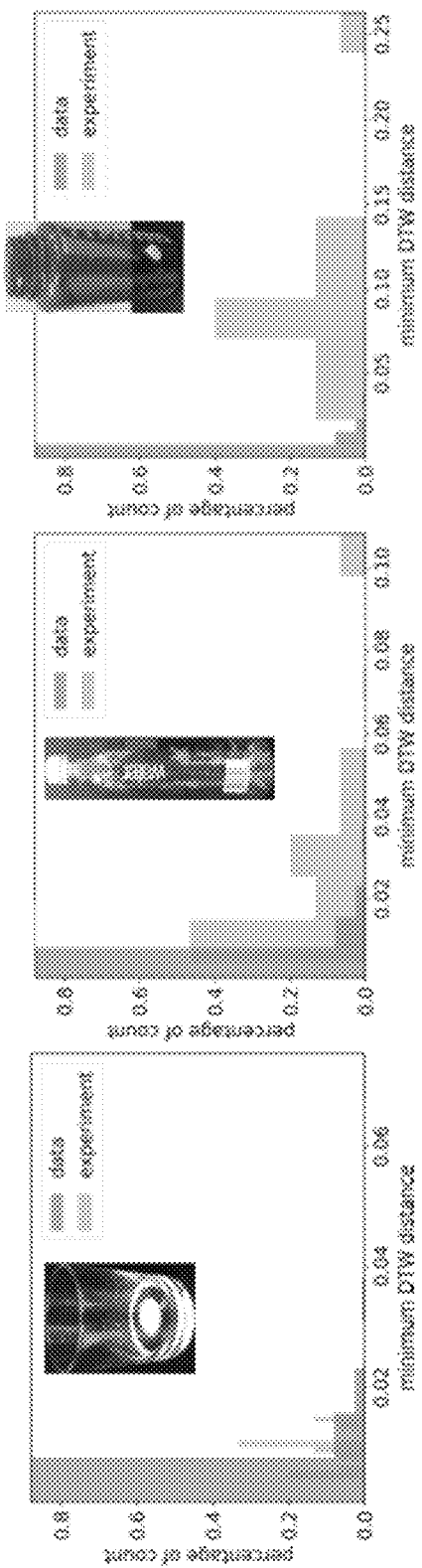

For each experiment, we plot the histogram of $p_i$'s for the training data together with the histogram of $q_i$'s for the experiment. We show the histogram in FIGS. 22A-22F. In FIGS. 22A and B, the histogram of the experiment is within and similar to the histogram of the data: the system described in this example repeated what it learned from data. In FIGS. 22C and D, the histogram of the experiment is within that of the data but has a different shape. In FIG. 22E, the histogram of the experiment has a similar shape to that of the data but its DTW distances exhibit a shift to the higher values. The above four experiments shows certain generalization. In FIG. 22F, the histogram of the experiment has a different shape from that of the data and it also has little overlap with the histogram of the data. According to FIG. 21F, the static vectors or the task specifications differ from those in the data, and to perform the tasks FIG. 22F shows that to perform the tasks the system did something different from the data. FIG. 21F together with FIG. 22F show that the system generalized.

The Effect of Viscosity

Figure 23:
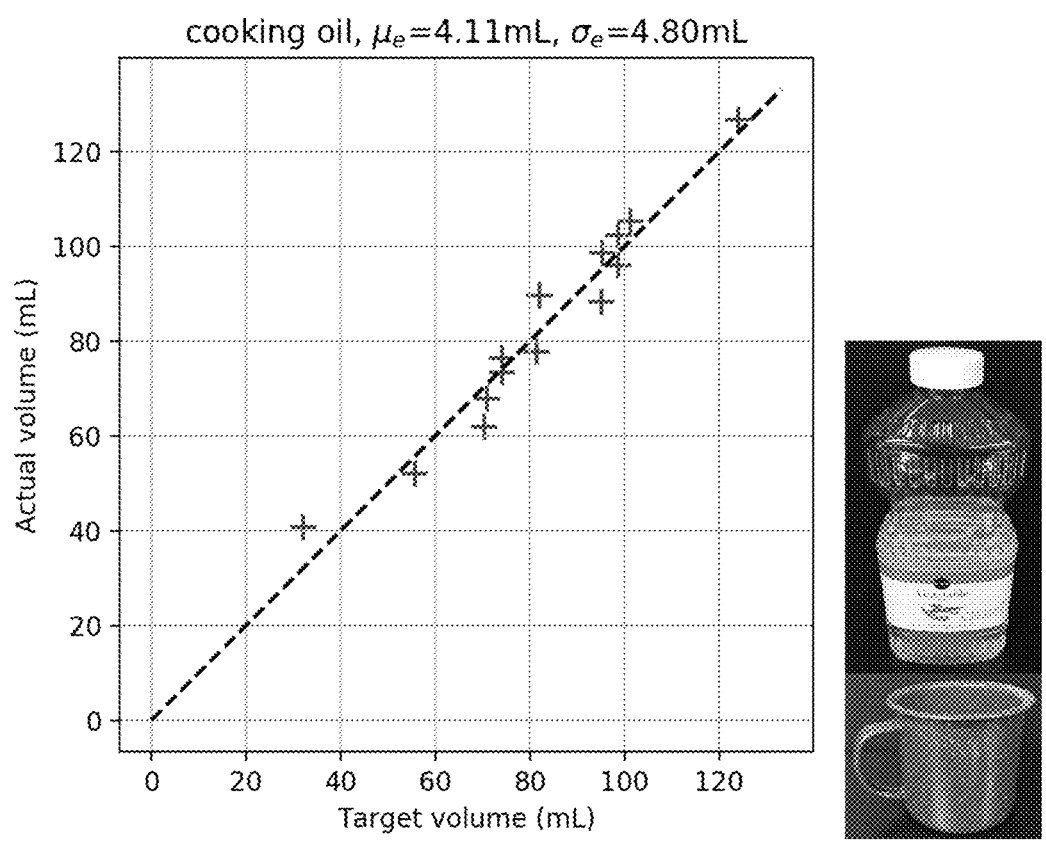
FIG. 23 illustrates actual-vs-target comparison of pouring oil using a red cup seen pouring water during training.
Figure 24:
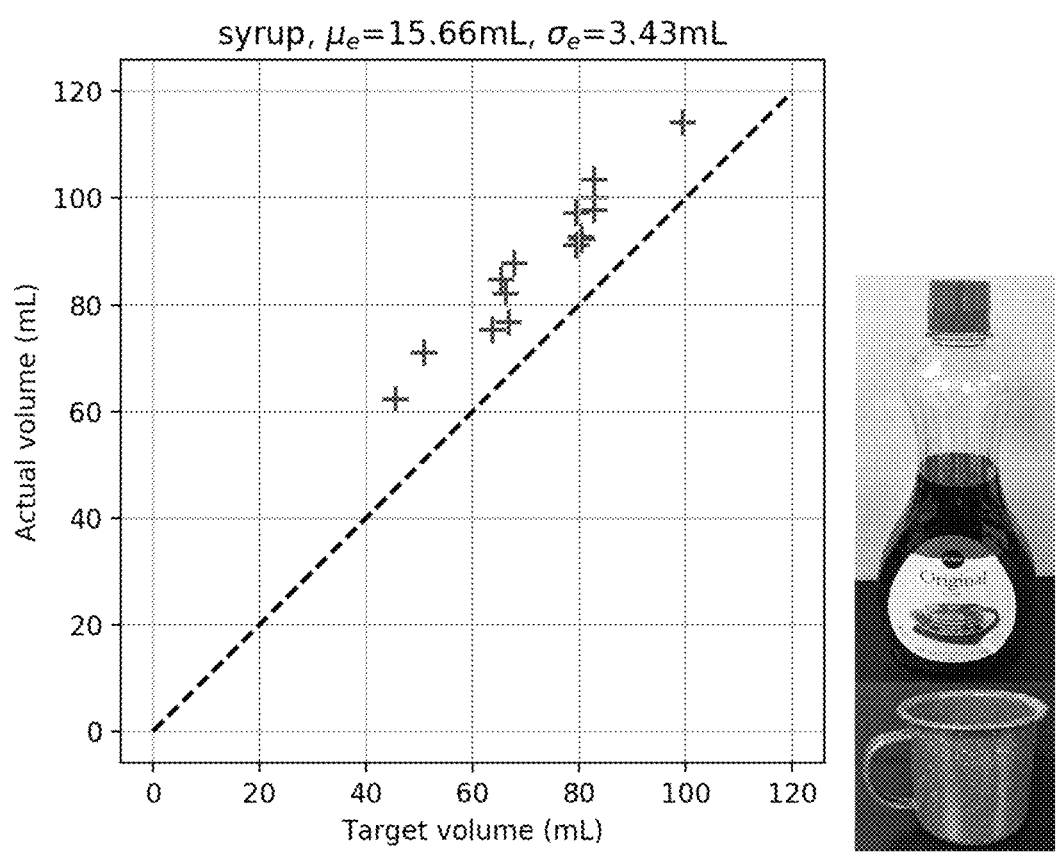
FIG. 24 illustrates actual-vs-target comparison of pouring syrup using a red cup seen pouring water during training.

We wanted to find out if the system described in this example was able to generalize to liquid with different viscosity from water. Therefore, we tested the system on pouring cooking oil and syrup with the red cup, respectively. The red cup was used for training but the data only included it being used for pouring water. Therefore, pouring oil and syrup for the red cup is generalizing. FIG. 23 shows the accuracy of pouring oil, which is lower than but comparable with that of pouring water (FIG. 15A). It may be because the density and viscosity is not significantly different from water. FIG. 24 shows that syrup is always over-poured. It may be because it took longer for the syrup in the air to reach the receiving container which delayed the response of the system. The density of oil and syrup we used for computing the volume from force is 0.92 g/mL and 1.37 g/mL respectively, in comparison to that of water which is 0.997 g/mL.

Figure 25:
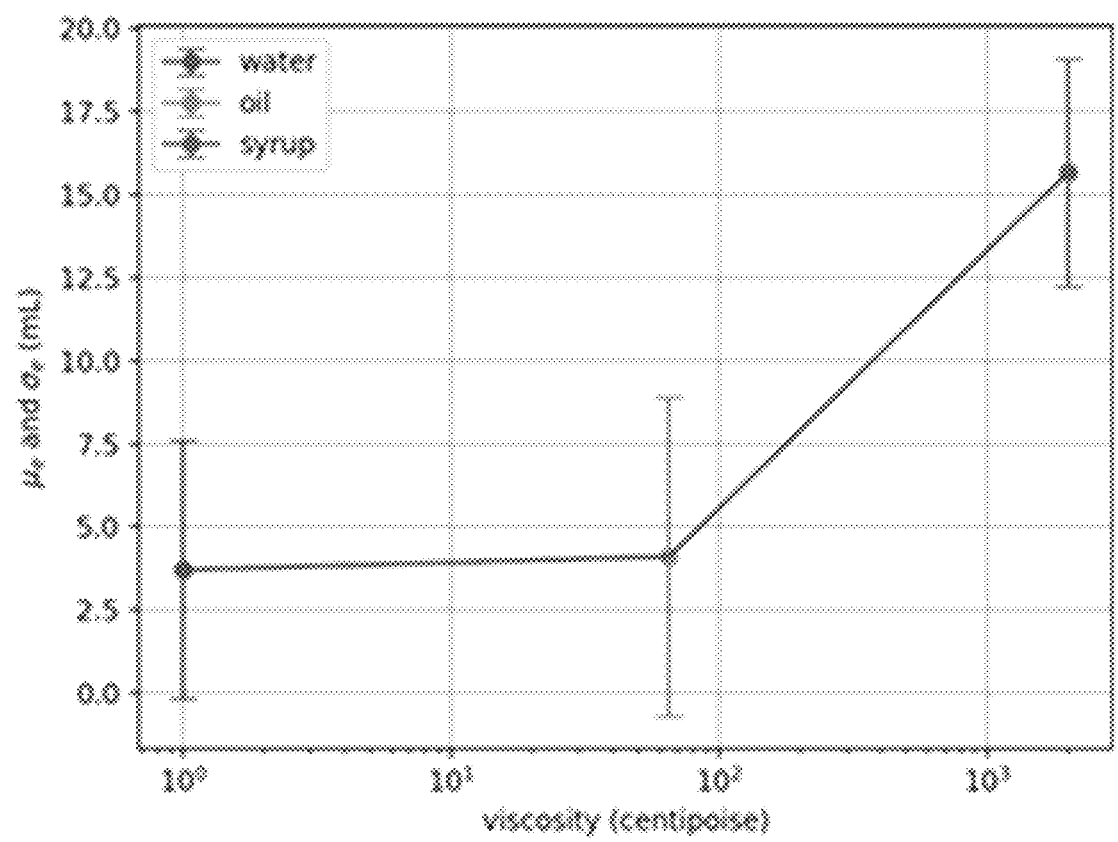
FIG. 25 illustrates pouring accuracy of liquids with different viscosity. x-axis plotted in logarithm.

Viscosity may play a role in the accuracy of pouring different kinds of liquid. Therefore, in FIG. 25 we show the error bars of pouring water, oil, and syrup with the red cup versus their viscosity. The three types of liquid have very different viscosities. We use 1 centipoise (cps) as the viscosity for water, 65 centipoise for oil, and 2000 for syrup. We plotted the viscosities in logarithm scale. Equivalently but in another form, Table II (FIG. 26B) lists the accuracy of pouring liquids with different viscosities. FIG. 25 and Table II (FIG. 26B) show that error mean $\mu_e$ increases as the viscosity increases and the relationship is neither linear nor exponential.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for generating a trajectory of a dynamical system, comprising:
    modelling a policy from demonstration data, wherein the policy is a distribution of a plurality of system actions conditioned on a plurality of system states and outcomes;
    generating a first set of action particles by sampling from the policy, wherein each of the action particles in the first set includes a respective system action;
    predicting a respective outcome of the dynamical system in response to each of the action particles in the first set;
    weighting each of the action particles in the first set according to a respective probability of achieving a desired outcome of the dynamical system, wherein the respective probabilities of achieving the desired outcome are determined using the respective outcome of the dynamical system in response to each of the action particles in the first set;
    generating a second set of action particles by sampling from the weighted action particles, wherein each of the action particles in the second set includes a respective system action; and
    selecting a next system action in the trajectory of the dynamical system from the action particles in the second set.

2. The computer-implemented method of claim 1, wherein the policy is modeled using a recurrent mixture density network (RMDN).

3. The computer-implemented method of claim 1, wherein weighting each of the action particles in the first set according to a respective probability of achieving a desired outcome of the dynamical system comprises:
    calculating a respective reward value for each of the action particles in the first set by comparing a respective outcome of the dynamical system in response to each of the action particles in the first set with the desired outcome of the dynamical system; and
    weighting each of the action particles in the first set by a respective reward value.

4. The computer-implemented method of claim 1, wherein selecting a next system action in the trajectory of the dynamical system from the action particles in the second set comprises:
    estimating a probability density function of the action particles in the second set; and
    selecting the next system action using the probability density function.

5. The computer-implemented method of claim 1, wherein generating a second set of action particles by sampling from the weighted action particles comprises importance sampling from the weighted action particles.

6. The computer-implemented method of claim 1, wherein the respective outcome of the dynamical system in response to each of the action particles in the first set is associated with a confidence value.

7. The computer-implemented method of claim 6, wherein the respective outcome of the dynamical system in response to each of the action particles in the first set is predicted using a recurrent mixture density network (RMDN).

8. The computer-implemented method of claim 1, wherein the desired outcome is defined by a user.

9. The computer-implemented method of claim 1, wherein the policy is represented in a stochastic fashion.

10. The computer-implemented method of claim 1, wherein the trajectory comprises a plurality of sequential system states over time.

11. The computer-implemented method of claim 1, wherein the dynamical system is a robotic system.

12. The computer-implemented method of claim 1, wherein the demonstration data is human demonstration data.

13. A system for generating a trajectory of a dynamical system, comprising:
    a recurrent mixture density network (RMDN) configured to model a policy from demonstration data, wherein the policy is a distribution of a plurality of system actions conditioned on a plurality of system states and outcomes; and
    a processor and a memory operably connected to the processor, wherein the memory has computer-executable instructions stored thereon that, when executed by the processor, cause the processor to:
        generate a first set of action particles by sampling from the policy, wherein each of the action particles in the first set includes a respective system action;
        predict a respective outcome of the dynamical system in response to each of the action particles in the first set;
        weight each of the action particles in the first set according to a respective probability of achieving a desired outcome of the dynamical system, wherein the respective probabilities of achieving the desired outcome are determined using the respective outcome of the dynamical system in response to each of the action particles in the first set;

generate a second set of action particles by sampling from the weighted action particles, wherein each of the action particles in the second set includes a respective system action; and select a next system action in the trajectory of the dynamical system from the action particles in the second set.

14. The system of claim 13, further comprising a robot, wherein the memory has further computer-executable instructions stored thereon that, when executed by the processor, cause the processor to transmit a command including the next system action to the robot.

15. The system of claim 13, wherein the policy is modeled using a recurrent mixture density network (RMDN).

16. The system of claim 13, wherein weighting each of the action particles in the first set according to a respective probability of achieving a desired outcome of the dynamical system comprises:

calculating a respective reward value for each of the action particles in the first set by comparing a respective outcome of the dynamical system in response to each of the action particles in the first set with the desired outcome of the dynamical system; and weighting each of the action particles in the first set by a respective reward value.

17. The system of claim 13, wherein selecting a next system action in the trajectory of the dynamical system from the action particles in the second set comprises:

estimating a probability density function of the action particles in the second set; and selecting the next system action using the probability density function.

18. The system of claim 13, wherein generating a second set of action particles by sampling from the weighted action particles comprises importance sampling from the weighted action particles.

19. The system of claim 13, wherein the respective outcome of the dynamical system in response to each of the action particles in the first set is associated with a confidence value.

20. The system of claim 13, wherein the respective outcome of the dynamical system in response to each of the action particles in the first set is predicted using a recurrent mixture density network (RMDN).

* * * * *